(12) United States Patent
Teraguchi

(10) Patent No.: US 11,241,981 B2
(45) Date of Patent: Feb. 8, 2022

(54) VEHICLE SEAT RECLINING DEVICE

(71) Applicant: TOYOTA BOSHOKU KABUSHIKI KAISHA, Aichi-ken (JP)

(72) Inventor: Hiroaki Teraguchi, Aichi-ken (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 17/315,736

(22) Filed: May 10, 2021

(65) Prior Publication Data

US 2021/0354601 A1    Nov. 18, 2021

(30) Foreign Application Priority Data

May 13, 2020   (JP) .............................. JP2020-084518

(51) Int. Cl.
*B60N 2/235*     (2006.01)
*B60N 2/22*      (2006.01)

(52) U.S. Cl.
CPC ........... *B60N 2/2362* (2015.04); *B60N 2/224* (2013.01)

(58) Field of Classification Search
CPC .... B60N 2/236; B60N 2/2356; B60N 2/2362; B60N 2/2358; B60N 2/224
See application file for complete search history.

(56) References Cited

U.S. PATENT DOCUMENTS

| | | | |
|---|---|---|---|
| 9,573,493 B2 * | 2/2017 | Nagura | B60N 2/2356 |
| 2012/0161488 A1 * | 6/2012 | Ishihara | B60N 2/236 297/367 R |
| 2015/0035339 A1 | 2/2015 | Endou et al. | |
| 2015/0360589 A1 * | 12/2015 | Robinson | B60N 2/236 297/367 P |
| 2016/0059743 A1 * | 3/2016 | Tsuji | B60N 2/2252 297/362 |
| 2018/0043800 A1 | 2/2018 | Maeda et al. | |

FOREIGN PATENT DOCUMENTS

| | | |
|---|---|---|
| JP | 2014-217662 A | 11/2014 |
| JP | 2015-029635 A | 2/2015 |
| JP | 2015-227071 A | 12/2015 |
| JP | 2018-23583 A | 2/2018 |

* cited by examiner

*Primary Examiner* — Milton Nelson, Jr.
(74) *Attorney, Agent, or Firm* — Greenblum & Bernstein, P.L.C.

(57) ABSTRACT

A vehicle seat reclining device includes: a ratchet and a guide assembled to be rotatable relative to each other; a plurality of pawls respectively supported by a plurality of corresponding pairs of guide walls of the guide and configured to mesh with the ratchet; and a cam configured to press the pawls in a radial direction by a biasing force of a lock spring. The guide has: welding dowels configured to be welded to a seat frame, the respective welding dowels being formed between the respective pairs of guide walls; and a hooking hole formed between a specific pair of guide walls, an end portion of the lock spring being hooked in the hooking hole. In a state before the welding dowels are welded to the seat frame, a width between the specific pair of guide walls is larger than a width between another pair of guide walls.

2 Claims, 21 Drawing Sheets

VEHICLE SEAT RECLINING DEVICE

CROSS-REFERENCE TO RELATED APPLICATIONS

This application claims priority from Japanese Patent Application No. 2020-084518 filed on May 13, 2020, the entire contents of which are incorporated herein by reference.

TECHNICAL FIELD

The present disclosure relates to a vehicle seat reclining device. Specifically, the present disclosure relates to a vehicle seat reclining device for adjusting an inclination angle of a seatback.

BACKGROUND

Patent Literature JP-A-2018-23583 discloses a vehicle seat reclining device that includes a stepped lock mechanism capable of adjusting a backrest angle of a seatback by a constant pitch angle. The vehicle seat reclining device is a joint device that couples the seatback to a seat cushion in such a way that the backrest angle is adjustable. Specifically, the vehicle seat reclining device includes a ratchet and a guide that are constituted by substantial disk-shaped metal members assembled to be rotatable relative to each other, and a lock mechanism that locks the relative rotation between the ratchet and the guide.

The lock mechanism locks the relative rotation between the ratchet and the guide with the use of a plurality of pawls set on the guide being pressed against and meshed with inner circumferential teeth formed on an outer circumferential portion of the ratchet by biasing. The pawls are supported by the guide from both sides in the rotation direction and are guided to be movable inward and outward in the radial direction only.

In the guide that supports the pawls from both sides in the rotation direction, the width between guide walls that support the pawls may vary due to the influence of thermal strain caused by welding of the guide to a seat frame.

SUMMARY

The present disclosure provides a vehicle seat reclining device capable of reducing a variation in width between guide walls that support pawls from both sides in a rotation direction.

A vehicle seat reclining device according to the present disclosure includes a ratchet and a guide, a plurality of pawls, a lock spring, and a cam. The ratchet and the guide are assembled in an axial direction to be rotatable relative to each other. The guide includes a plurality of pairs of guide walls. The plurality of pawls are respectively supported by the plurality of corresponding pairs of guide walls from both sides in a rotation direction, and are configured to mesh with the ratchet by being pressed outward in a radial direction to lock a relative rotation between the ratchet and the guide. The cam is configured to press the plurality of pawls from an inner side to an outer side in the radial direction by a biasing force of the lock spring.

The guide has: welding dowels protruding outward in the axial direction and configured to be welded to a seat frame, the respective welding dowels being formed between the respective pairs of guide walls, and a hooking hole formed between a specific pair of guide walls included in the plurality of pairs of guide walls, an end portion of the lock spring being hooked in the hooking hole. In a state before the welding dowels are welded to the seat frame, a width between the specific pair of guide walls in which the hooking hole is formed is larger than a width between another pair of guide walls included in the plurality of pairs of guide walls.

According to the above configuration, the width between the specific pair of guide walls in which the hooking hole is formed is likely to contract due to thermal strain caused by welding of the welding dowel due to a decrease in rigidity caused by the formation of the hooking hole. However, in the state before the welding dowels are welded to the seat frame, by setting the width between the specific pair of guide walls to be larger than the other width, a width after welding can be easily matched with the other width. As a result, it is possible to reduce variation in the widths between the guide walls.

DETAILED DESCRIPTION

Figure 1:
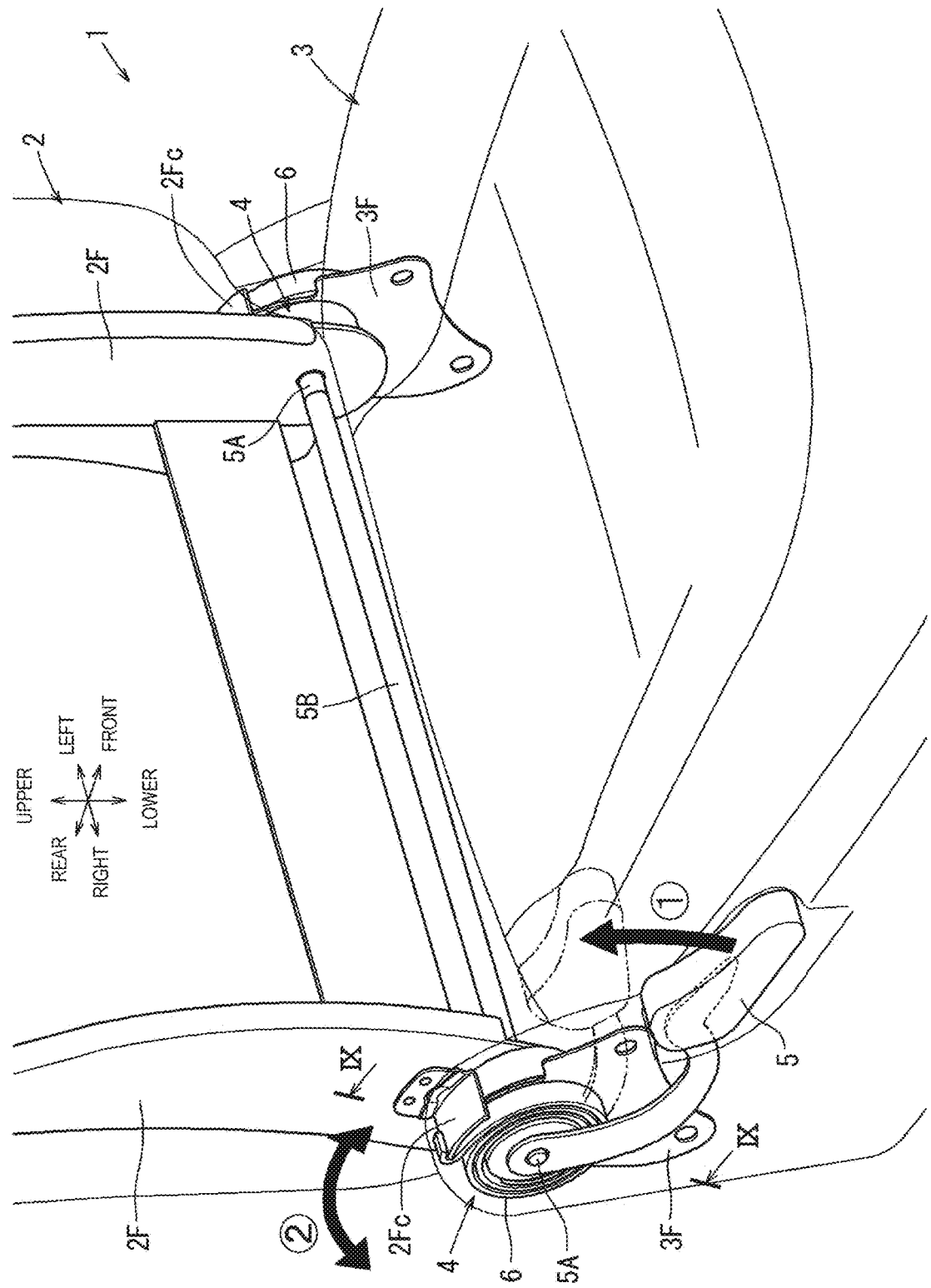
FIG. 1 is a perspective view showing a schematic configuration of a vehicle seat reclining device according to a first embodiment.

Hereinafter, embodiments of the present disclosure will be described with reference to the drawings.

First Embodiment

Schematic Configuration of Seat Reclining Device 4 (Vehicle Seat Reclining Device)

First, the configuration of the seat reclining device 4 according to the first embodiment of the present disclosure will be described with reference to FIGS. 1 to 21. In the following description, front-rear, upper-lower, and left-right directions and the like indicate respective directions shown in the drawings. The term "seat width direction" refers to the left-right direction of a seat 1 to be described later.

As shown in FIG. 1, the seat reclining device 4 according to the present embodiment is applied to the seat 1 that constitutes a right seat of an automobile. The seat reclining device 4 is a reclining adjustment mechanism that couples a seatback 2 constituting a backrest portion of the seat 1 to a seat cushion 3 constituting a seating portion in a state in which the backrest angle is adjustable. Specifically, a pair of left and right seat reclining devices 4 are provided between the seatback 2 and the seat cushion 3. The seat reclining devices 4 fix and release the backrest angle of the seatback 2 by being switched at the same time to locked and unlocked states.

Figure 2:
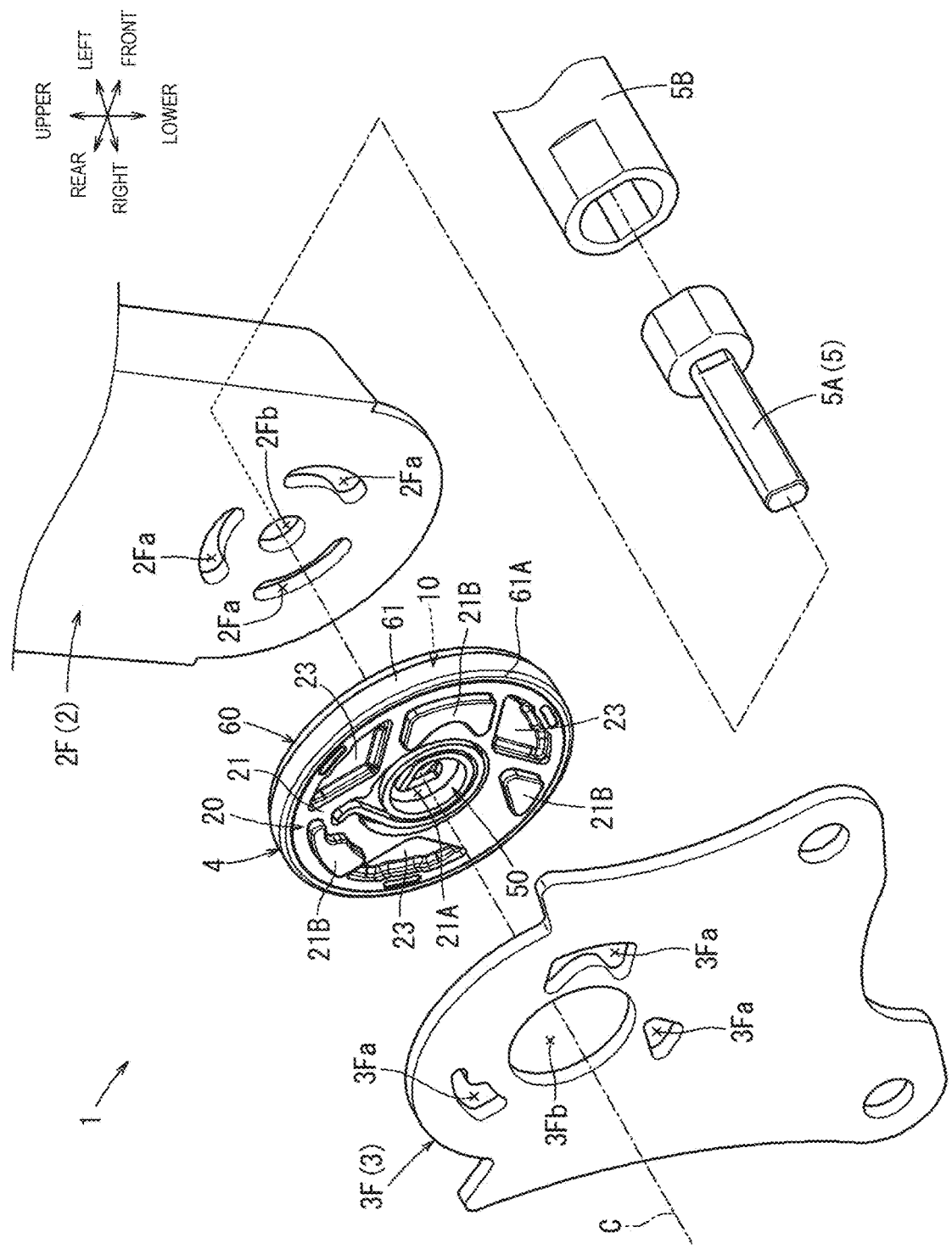
FIG. 2 is an enlarged exploded perspective view showing a main part of FIG. 1.
Figure 3:
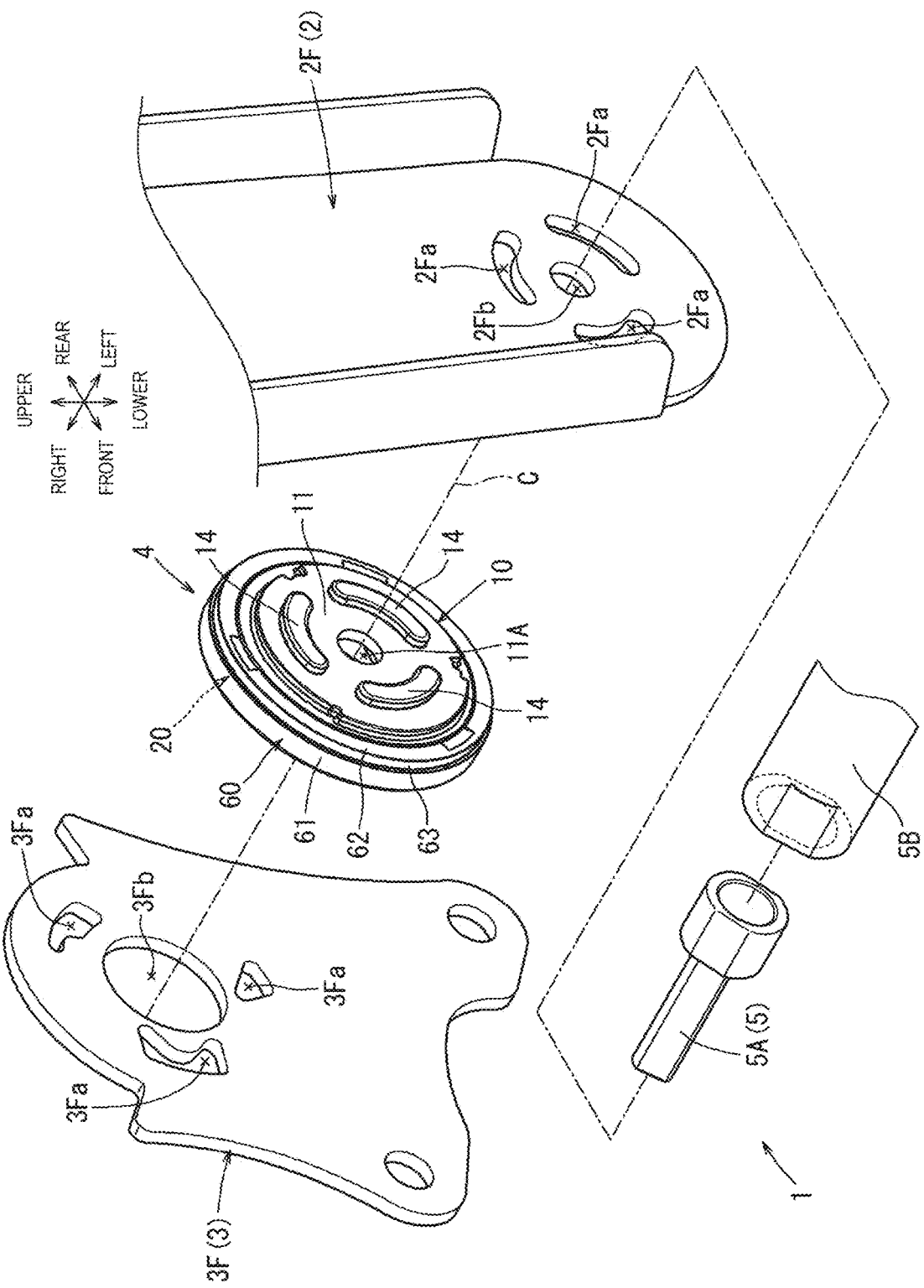
FIG. 3 is the exploded perspective view of FIG. 2 as viewed from the opposite side.

Specifically, as shown in FIGS. 2 and 3, the seat reclining devices 4 are interposed between corresponding lower end portions of side frames 2F constituting left and right side frames of the seatback 2 and corresponding reclining plates 3F coupled to rear end portions of left and right side frames of the seat cushion 3. The reclining plates 3F are located outward of the lower end portions of the side frames 2F in the seat width direction. The seat reclining devices 4 are coupled in a state of being relatively rotatable or prevented from rotating about the same axis.

As shown in FIG. 1, the seat reclining devices 4 are normally held in the locked state in which the backrest angle of the seatback 2 is fixed. The seat reclining devices 4 are released from the locked state at the same time when a reclining lever 5 provided on a side portion of the seat cushion 3 on the vehicle outer side (fight side) is pulled up (circled number 1 of FIG. 1) by a user. Accordingly, the seat reclining devices 4 are switched to the unlocked state in which the backrest angle of the seatback 2 is adjustable in the seat front-rear direction. When the reclining lever 5 is returned, the seat reclining devices 4 are returned to the locked state again by biasing.

Return springs 6 are hooked between the corresponding left and right side frames 2F of the seatback 2 and the corresponding reclining plates 3F located outward of the side frames 2F. The return springs 6 apply spring biasing forces in a direction in which the seatback 2 is tilted forward. With the rotational biasing forces of the return springs 6, the fixed state of the backrest angle by the seat reclining devices 4 is released, and thereby the seatback 2 is raised to a position where the seatback 2 abuts against the back of a seated occupant.

Figure 20:
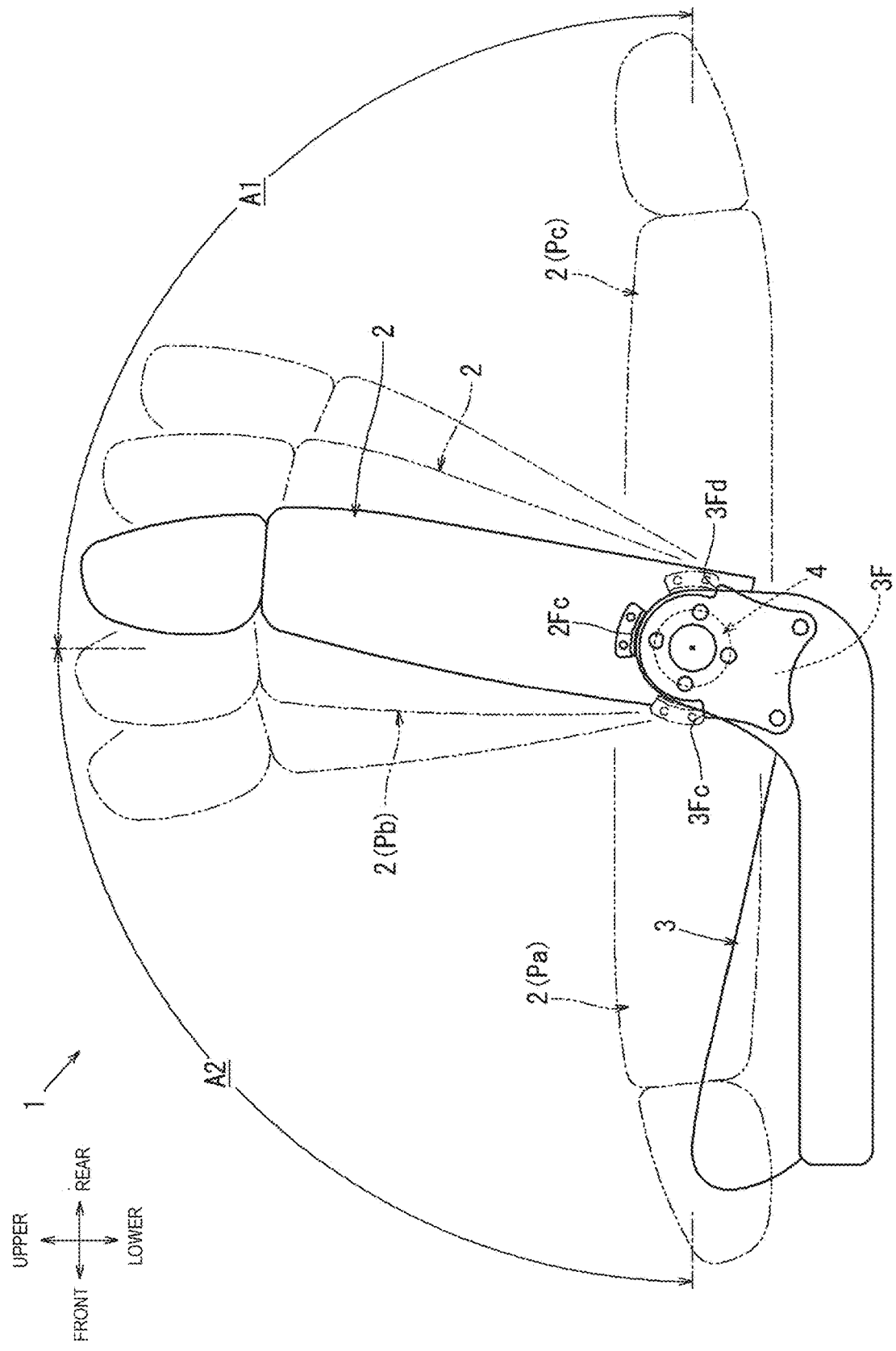
FIG. 20 is a side view showing an angle adjustment range of a seatback.

The backrest angle of the seatback 2 is freely adjusted in the front-rear direction in accordance with the movement of the back of the seated occupant of being tilted in the front-rear direction (circled number 2 of FIG. 1). In this way, by providing the return springs 6 that apply the forward rotational biasing forces to the seatback 2, the backrest angle of the seatback 2 can be easily adjusted. Specifically, as shown in FIG. 20, the seatback 2 can rotate in the seat front-rear direction in a rotation region of about 180 degrees between a forward-tilted position Pa in which the seatback 2 is folded into an upper surface of the seat cushion 3 and a rearward tilted position Pc in which the seatback 2 is tilted rearward substantially horizontally.

The structure for locking the seatback 2 in the forward-tilted position Pa is formed by locking plates 2Fc, which are coupled to outer surface portions of the side frames 2F of the seatback 2, being abutted against and locked to front stoppers 3Fc protruding from front edge portions of the reclining plates 3F. The structure for locking the seatback 2 in the rearward tilted position Pc is formed by the locking plates 2Fc, which are coupled to the outer surface portions of the side frames 2F of the seatback 2, being abutted against and locked to rear stoppers 3Fd protruding from rear edge portions of the reclining plates 3F.

Here, of the above-described rotation region of the seatback 2, a rotation region of about 90 degrees from an initial lock position Pb, in which the seatback 2 is at a backrest angle of standing substantially vertically, to the rearward tilted position Pc is set as a "lock region A1", in which the backrest angle of the seatback 2 is returned to the fixed state by releasing the operation of pulling up the reclining lever 5. A rotation region from a position in which the backrest angle of the seatback 2 is about 90 degrees from the initial lock position Pb to the forward-tilted position Pa is set as a "free region A2", in which the angle of the seatback 2 is not fixed but maintained in a released state (state in which the lock is disabled) even when the operation of pulling up the reclining lever 5 is released.

By setting the free region A2, when the reclining lever 5 is operated and the seatback 2 is tilted forward to a position where the seatback 2 enters the free region A2 in a state in which no person is seated in the seat 1, the seatback 2 is tilted to the forward-tilted position Pa by its own weight or the biasing forces of the return springs 6 even when the operation of the reclining lever 5 is stopped.

Specifically, as shown in FIGS. 2 and 3, each of the seat reclining devices 4 includes a ratchet 10 (see FIG. 2) integrally coupled to the outer surface portion of the side frame 2F on a corresponding side of the seatback 2, and a guide 20 (see FIG. 3) integrally coupled to an inner surface portion of the corresponding reclining plate 3F. The seat reclining device 4 fixes and releases the backrest angle of the seatback 2 by being switched in such a way that the relative rotation between the ratchet 10 and the guide 20 is locked and released.

Configurations of Components of Seat Reclining Device 4

Hereinafter, configurations of components of the pair of left and right seat reclining devices 4 will be described in detail. The seat reclining devices 4 have the same configurations that are bilaterally symmetrical to each other. Therefore, hereinafter, the configuration of the seat reclining device 4 disposed on the vehicle outer side (right side) shown in FIGS. 2 and 3 will be described in detail.

Figure 4:
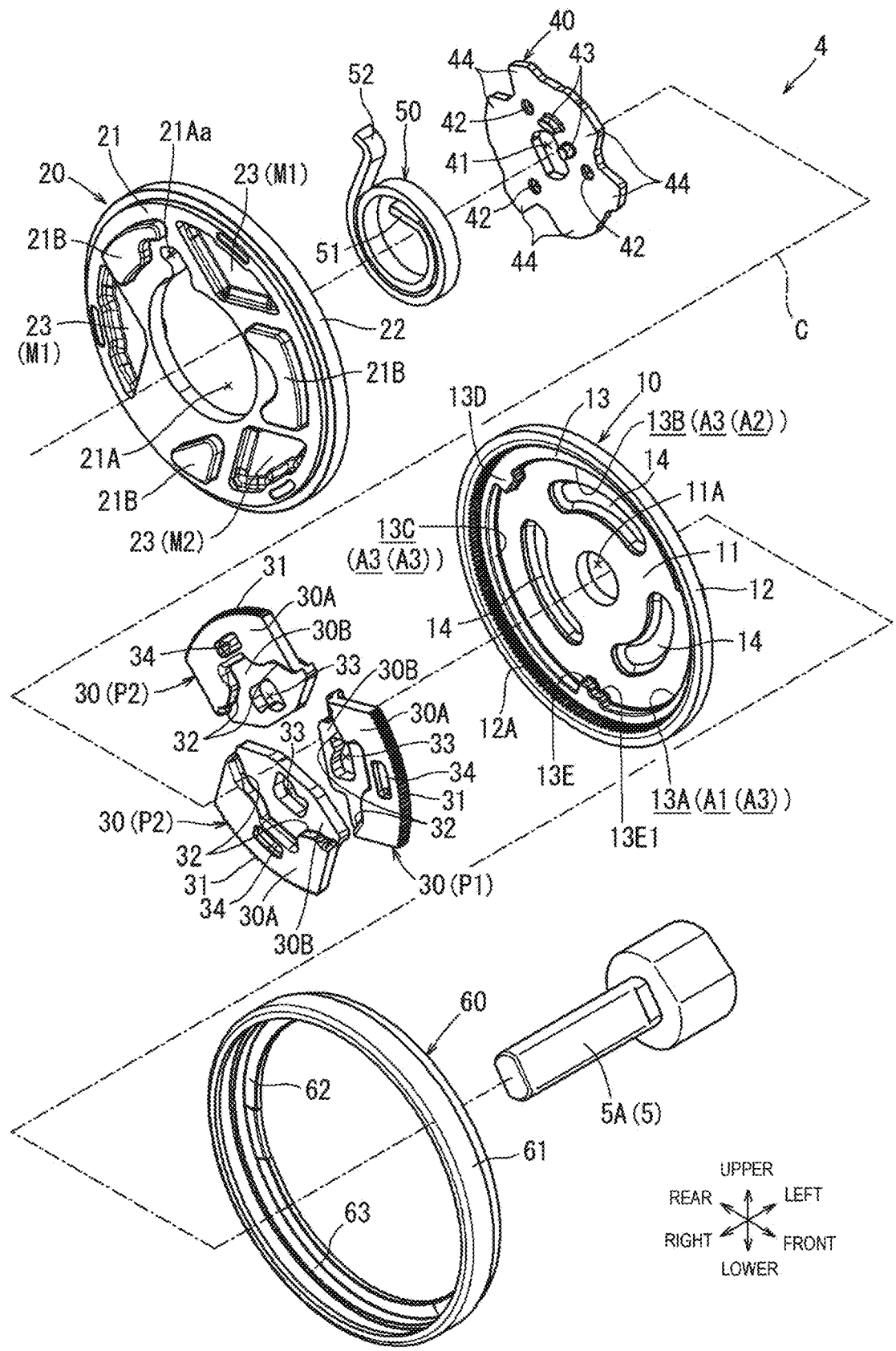
FIG. 4 is an exploded perspective view of the vehicle seat reclining device.
Figure 5:
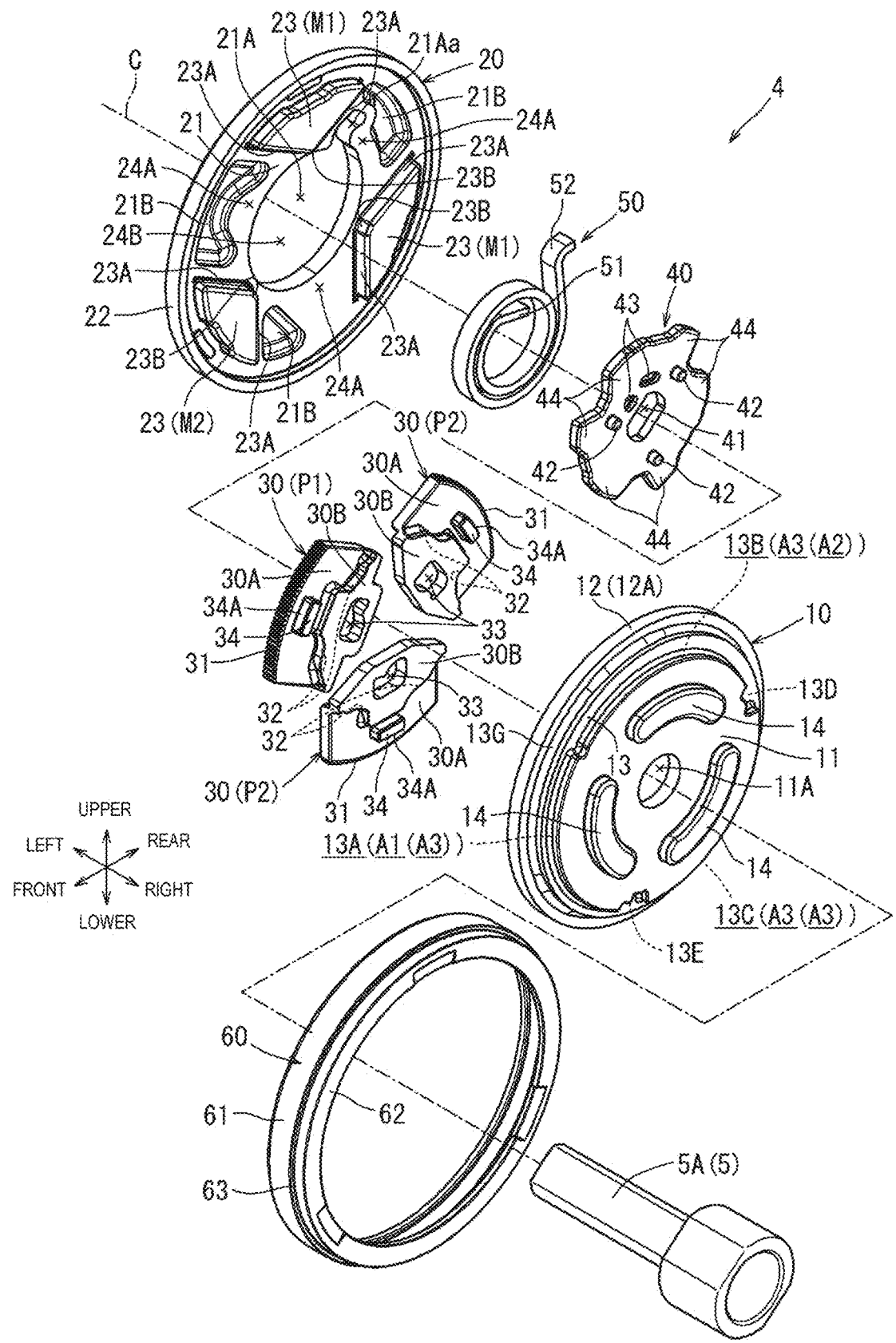
FIG. 5 is the exploded perspective view of FIG. 4 as viewed from the opposite side.

As shown in FIGS. 4 and 5, the seat reclining device 4 includes the ratchet 10 and the guide 20, which are assembled to each other in the axial direction and have a substantially circular plate shape, three pawls 30 assembled between the ratchet 10 and the guide 20, and a rotary cam 40 that moves the pawls 30 inward and outward in the radial direction. The seat reclining device 4 further includes a lock spring 50 (spiral spring) that biases the rotary cam 40 in the lock rotation direction relative to the guide 20, and a substantially cylindrical outer circumferential ring 60 that is installed across outer circumferential portions of the ratchet 10 and the guide 20.

The outer circumferential ring 60 functions as a holding member that holds the ratchet 10 and the guide 20 in a state of being assembled to each other in the axial direction. Here, the rotary cam 40 corresponds to a "cam" of the present disclosure. Each of the ratchet 10, the guide 20, the three pawls 30, and the rotary cam 40 is hardened by quenching processing after press molding and has high structural strength.

Ratchet 10

As shown in FIG. 4, the ratchet 10 is formed by cutting a metal plate-shaped member into a substantial disk shape and by extruding portions of the metal plate-shaped member in a half-punched shape in the plate thickness direction (axial direction). Specifically, a stepped cylindrical portion protruding in two stages in the axial direction, which is the assembling direction of the ratchet 10 to the guide 20, is extruded in a half-punched shape on an outer circumferential edge portion of a disk main body 11 of the ratchet 10.

A cylindrical part on an outer circumferential side of the stepped cylindrical portion constitutes a cylindrical portion 12 including inner teeth 12A on its entire inner circumferential surface. A cylindrical part on an inner circumferential side constitutes an intermediate cylindrical portion 13 having a shorter protruding length in the axial direction than the cylindrical portion 12. The inner teeth 12A of the cylindrical portion 12 have such a tooth surface shape that outer teeth 31 formed on outer circumferential surface portions of the pawls 30, which will be described later, can mesh with the inner teeth 12A from an inner side in the radial direction. Specifically, the inner teeth 12A have a shape in which tooth surfaces are arranged at equal intervals at a pitch of two degrees in the rotation direction.

The intermediate cylindrical portion 13 includes, at an inner circumferential surface portion, three regions (first region 13A, second region 13B, third region 13C) in which the inner diameter dimension from a rotation center C of the ratchet 10 and the length in the rotation direction are individually set, and a first convex portion 13D and a second convex portion 13E that protrude inward in the radial direction from corresponding boundary portions between regions.

Each of the first region 13A, the second region 13B, and the third region 13C is formed in an inner circumferential surface shape curving in an arc shape around the rotation center C of the ratchet 10. Specifically, as shown in FIG. 10, the first region 13A and the third region 13C have an inner circumferential surface shape of the same diameter slightly larger than that of the second region 13B.

Figure 10:
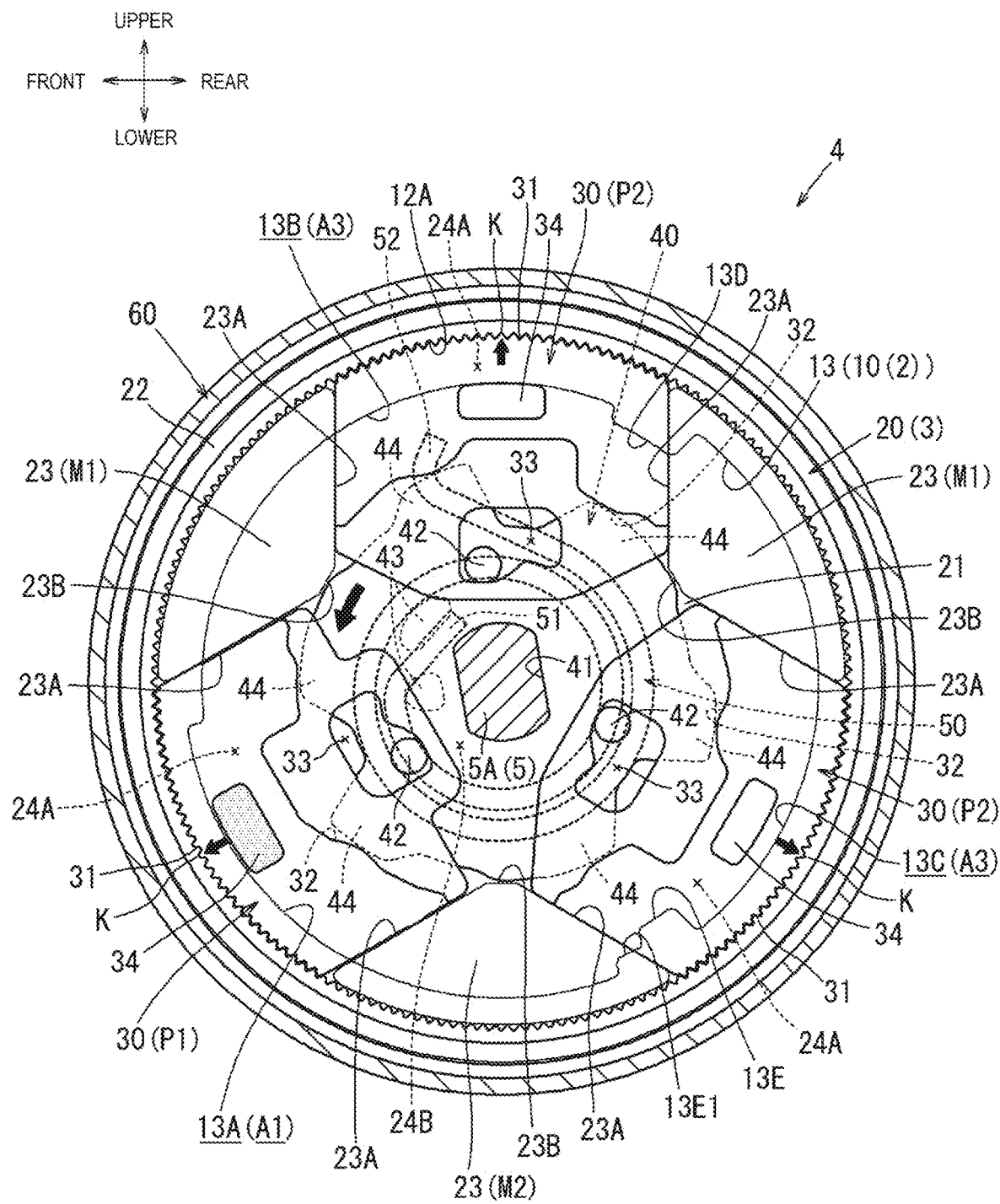
FIG. 10 is a sectional view taken along a line X-X of FIG. 8, showing a locked state of the vehicle seat reclining device.

As shown in FIG. 10, part (a) of FIG. 17, and part (a) of FIG. 18, when the ratchet 10 is at a rotation angle where the first region 13A overlaps with a main pawl P1 that is one of the three pawls 30 to be described later in the rotation direction, the first region 13A constitutes the lock region A1 in which the main pawl P1 is allowed to mesh with the inner teeth 31. The second region 13B and the third region 13C overlap with the corresponding remaining two sub-pawls P2 in the rotation direction at the above-described rotation angle and constitute relief regions A3 in which the sub-pawls P2 are allowed to mesh with the inner teeth 12A.

Figure 12:
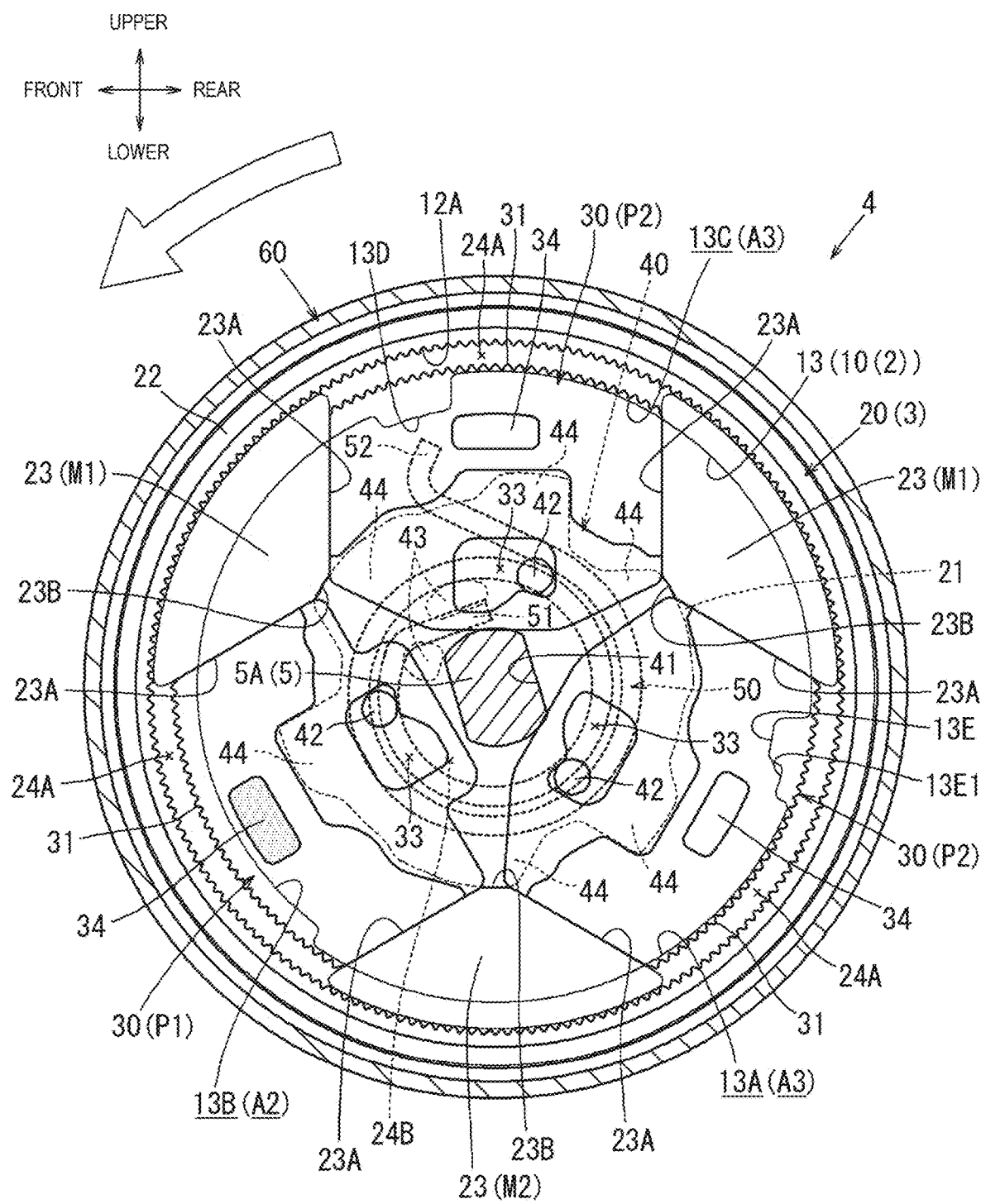
FIG. 12 is a sectional view showing a state in which a ratchet is rotated to a free region.
Figure 13:
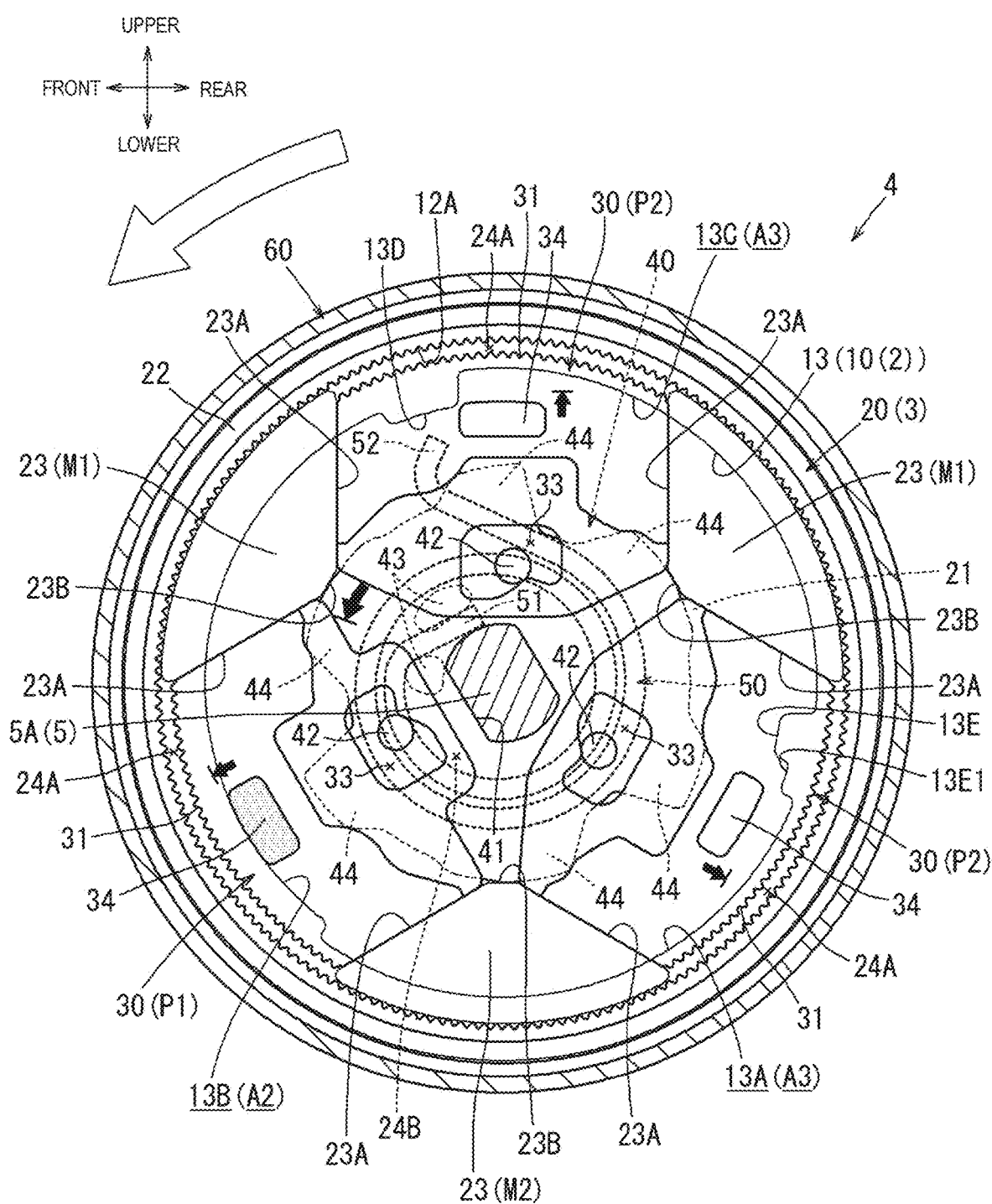
FIG. 13 is a sectional view showing a state in which locking of pawls is prevented in the free region.

On the other hand, when the ratchet 10 is at a rotation angle where the second region 13B overlaps with the main pawl P1 in the rotation direction as shown in FIG. 12, the second region 13B constitutes the free region A2 in which the main pawl. P1 rides on the inner circumferential surface and the meshing thereof with the inner teeth 12A is blocked, as shown in FIG. 13, part (b) of FIG. 17, and part (b) of FIG. 18. The third region 13C and the first region 13A overlap with the remaining two sub-pawls P2 in the rotation direction at the above-described rotation angle and constitute the relief regions A3 in which the movement of the sub-pawls P2 is released.

That is, the intermediate cylindrical portion 13 of the ratchet 10 allows the locking operation of the main pawl P1 in the first region 13A as shown in FIG. 10, and blocks the locking operation of the main pawl P1 in the second region 13B as shown in FIGS. 12 and 13. As shown in FIG. 10, when the locking operation of the main pawl P1 of the pawls 30 is allowed, the locking operation of the remaining two sub-pawls P2 is also allowed. As shown in FIGS. 12 and 13, when the locking operation of the main pawl of the pawls 30 is blocked, the locking operation of the remaining two sub-pawls P2 is also blocked.

In this way, the intermediate cylindrical portion 13 of the ratchet 10 controls the lock permission and prevention of the main pawl P1 by the first region 13A and the second region 13B. When the first region 13A functions as the lock region A1 (see FIG. 10), the other two regions (second region 13B, third region 13C) function as the relief regions A3 in which the lock operation of the remaining two sub-pawls P2 is allowed. When the second region 13B functions as the free region A2 (see FIG. 13), the other two regions (first region 13A, third region 13C) function as the relief regions 43 in which the movement of the remaining two sub-pawls P2 is released.

Figure 17:
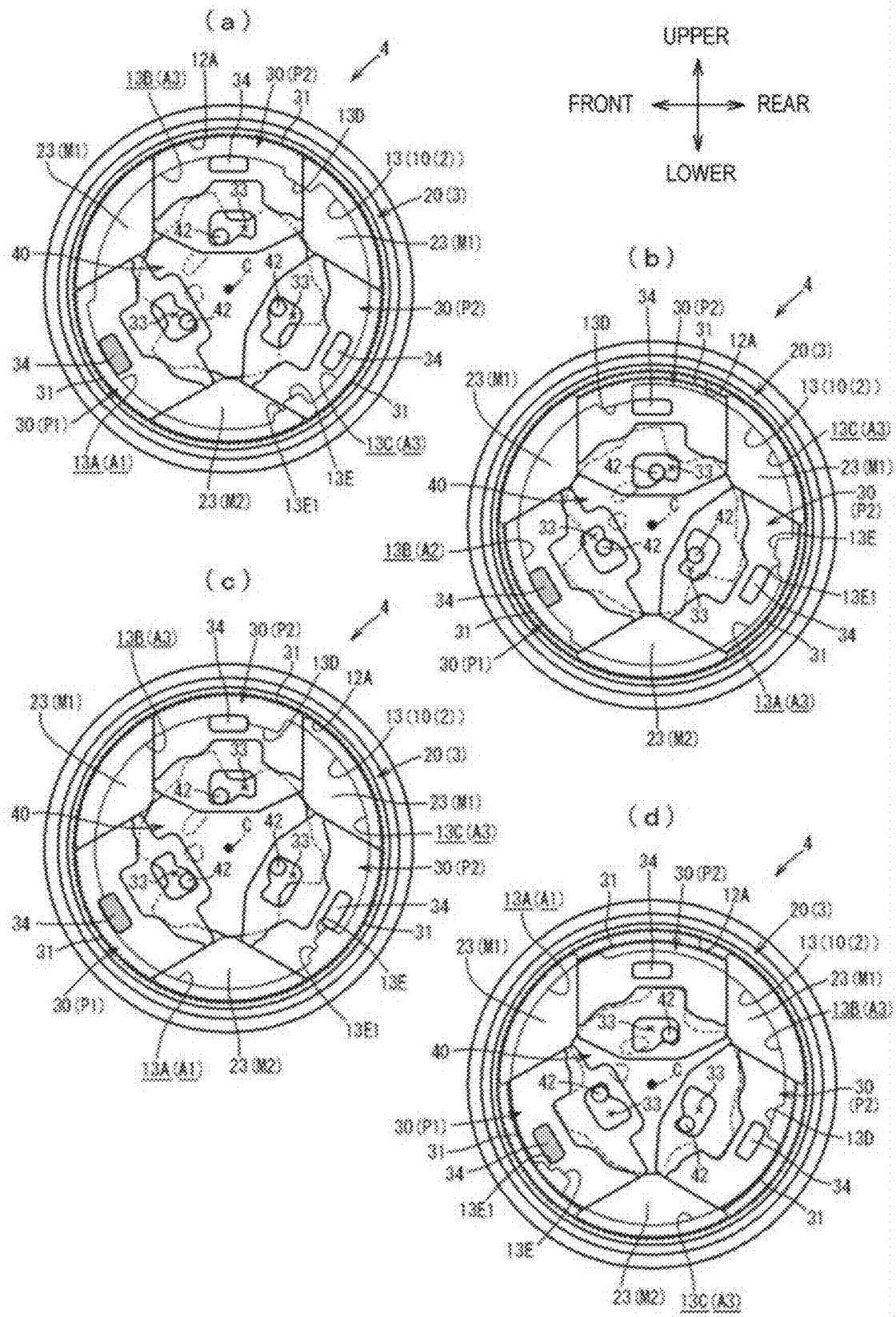
FIG. 17 is a sectional view showing four operation modes of pawls in corresponding rotation positions of the ratchet.
Figure 18:
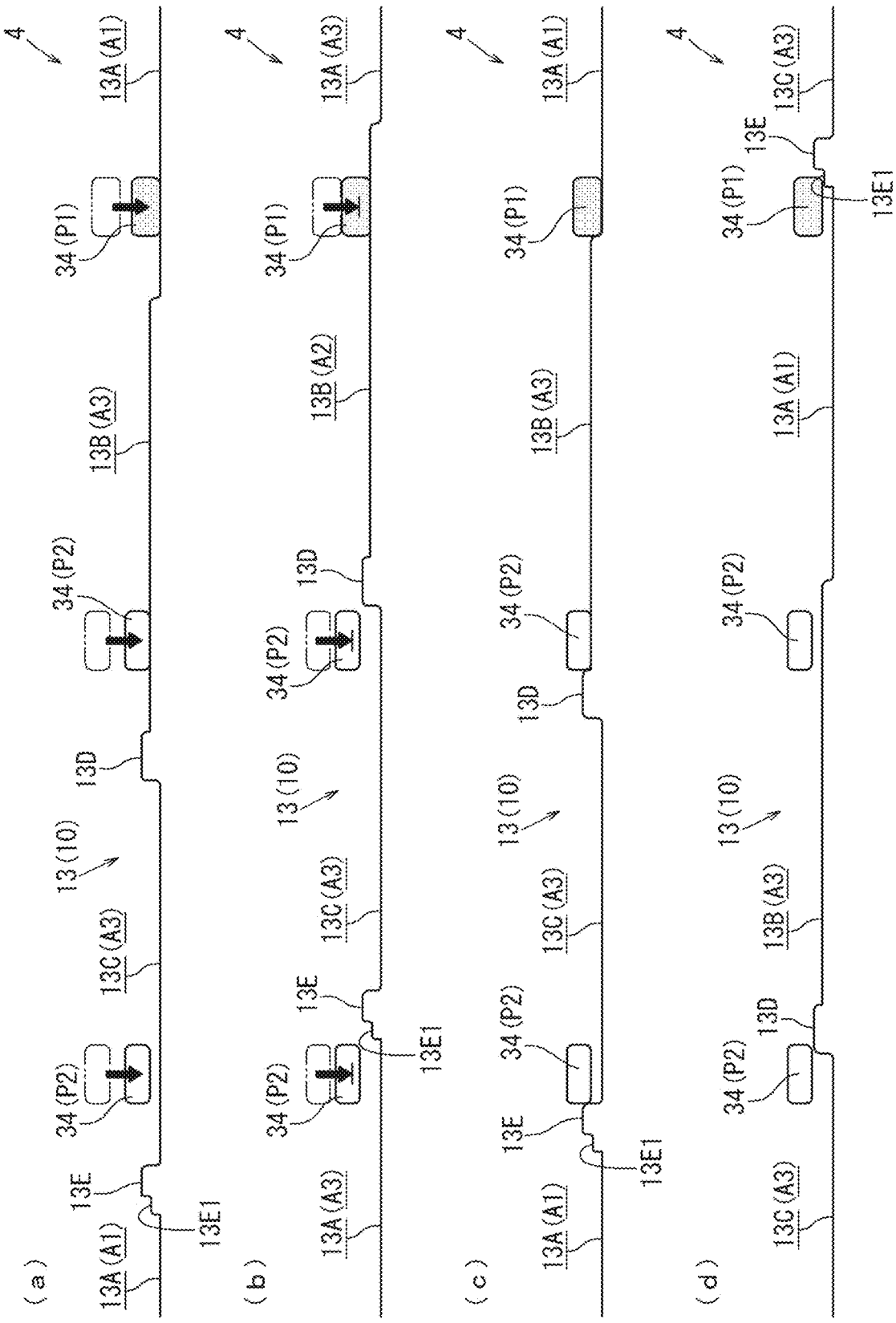
FIG. 18 is a schematic view showing positional relations between riding protrusions of the pawls and protruding portions of the ratchet corresponding to parts (a) to (d) of FIG. 17.

As shown in part (c) of FIG. 17 and part (c) of FIG. 18, when the main pawl P1 moves from the lock region A1 (first region 13A) to the free region A2 (second region 13B) by the rotation of the ratchet 10, the main pawl P1 may abut against a step between the first region 13A and the second region 13B in the rotation direction in a state in which the main pawl P1 is halfway pressed outward in the radial direction. In this case, the first convex portion 13D and the second convex portion 13E abut against the other two sub-pawls P2 in the rotation direction at the same time. By the above-described abutment, the load that the main pawl P1 receives in the rotation direction when the main pawl P1 abuts against the step can be distributed to the other two sub-pawls P2 at the same time.

Specifically, the first convex portion 13D and the second convex portion 13E are formed in positions where, when a riding protrusion 34 of the main pawl P1 abuts against the step between the first region 13A and the second region 13B in the rotation direction due to the rotation of the ratchet 10, riding protrusions 34 of the remaining two sub-pawls P2 can abut against the first convex portion 13D and the second convex portion 13E in the same rotation direction at the same time. Configurations of the riding protrusions 34 will be described in detail later.

Figure 14:
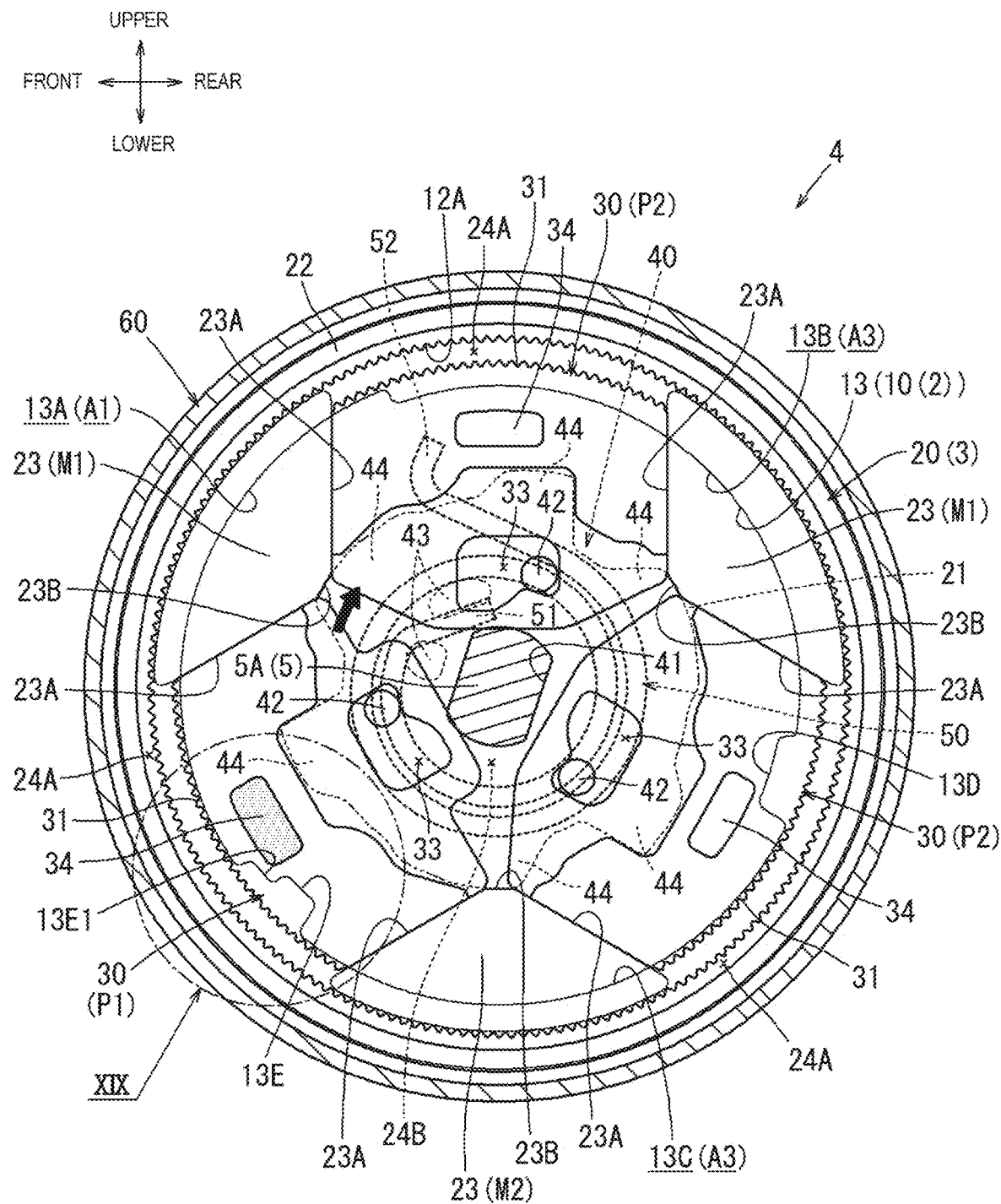
FIG. 14 is a sectional view showing a state in which the ratchet is rotated to a starting position of a lock region.

As shown in FIG. 14, part (d) of FIG. 17, and part (d) of FIG. 18, the second convex portion 13E protrudes on a starting side of the lock region A1 (first region 13A) in the rotation direction. That is, the second convex portion 13E protrudes at an end portion of the lock region A1 on the side opposite to the side adjacent to the free region A2 (second region 13B). The second convex portion 13E is formed in a position where the second convex portion 13E can overlap with the riding protrusion 34 of the main pawl P1 in the rotation direction as shown in FIG. 14, part (d) of FIG. 17, and part (d) of FIG. 18 when the seatback 2 is tilted to a starting of the lock region A1, that is, the rearward tilted position Pc as shown in FIG. 20.

The reason is as follows. That is, as shown in FIG. 20, when the seatback 2 is tilted to the rearward tilted position Pc, the locking plate 2Fc abuts against and is locked to the rear stopper 3Fd of the reclining plate 3F. At this time, when the riding protrusion 34 of the main pawl P1 shown in FIG. 14 abuts against the second convex portion 13E in the rotation direction before the locking plate 2Fc abuts against the rear stopper 3Fd of the reclining plate 3F due to the fitting of the seat reclining device 4 and peripheral components thereof, a large load is applied to the seat reclining device 4. Therefore, in order to prevent such a situation, the second convex portion 13E is formed with a relief recessed portion 13E1 that releases the abutment of the riding protrusion 34 of the main pawl P1 against the second convex portion 13E in the rotation direction.

Figure 19:
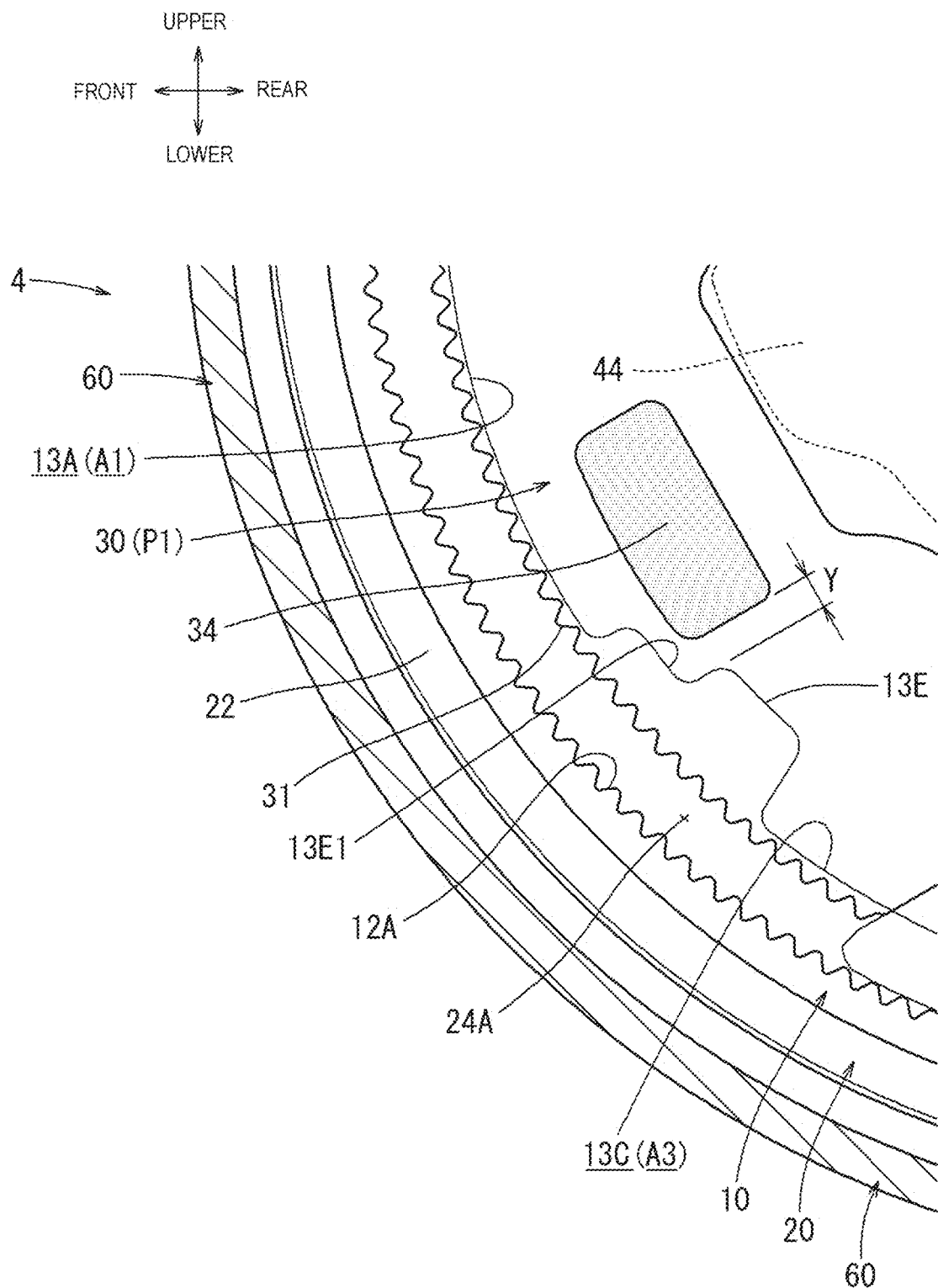
FIG. 19 is an enlarged view of a portion XIX of FIG. 14.

As shown in FIG. 19, the relief recessed portion 13E1 is formed in a shape in which a corner portion of the second convex portion 13E on a clockwise side in the drawing is thinned in a substantially rectangular shape. When the seatback 2 is tilted to the rearward tilted position Pc and the locking plate 2Fc is abutted against and locked to the rear stopper 3Fd of the reclining plate 3F as shown in FIG. 20 due to the dimensional variation due to the fitting, even when the riding protrusion 34 of the main pawl P1 overlaps with the second convex portion 13E in the rotation direction as shown in FIG. 19, the relief recessed portion 13E1 receives the riding protrusion 34 so that the riding protrusion 34 does not abut against the second convex portion 13E in the rotation direction. Specifically, the relief recessed portion 13E1 receives the riding protrusion 34 in a state in which a gap Y in the rotation direction is defined between the relief recessed portion 13E1 and a side surface of the riding protrusion 34 on a counterclockwise side in the drawing.

When the riding protrusion 34 of the main pawl P1 that has entered the relief recessed portion 13E1 is pressed outward in the radial direction, the riding protrusion 34 rides on an inner circumferential surface of the relief recessed portion 13E1 so that the main pawl P1 is prevented from meshing with the inner teeth 12A of the ratchet 10. As a result, the main pawl P1 is not locked to the inner teeth 12A of the ratchet 10 in a position where the riding protrusion 34 of the main pawl P1 enters the relief recessed portion 13E1 (rotation position beyond the lock region A1).

As shown in FIGS. 4 and 5, a circular-shaped through hole 11E passes through a central portion (position on the rotation center C) of the disk main body 11 of the ratchet 10. An operation pin 5A, which is inserted into and installed on a central portion (position on the rotation center C) of the rotary cam 40 which will be described later, is inserted into the through hole 11A to be rotatable from an outer side in the axial direction.

As shown in FIG. 3, the ratchet 10 is set in such a way that an outer surface of the disk main body 11 is in surface contact with an outer surface of the side frame 2F of the seatback 2, and the ratchet 10 is integrally coupled to the side frame 2F of the seatback 2 by welding the contact portions of the ratchet 10 and the side frame 2F. Specifically, in the ratchet 10, three welding dowels 14 protruding from the outer surface of the disk main body 11 are fitted into three corresponding fitting holes 2Fa formed in the side frame 2F of the seatback 2, and the fitting portions are integrally coupled to the outer surface of the side frame 2F by arc welding.

As shown in FIG. 5, the welding dowels 14 are formed one by one in regions in the rotation direction where the first region 13A, the second region 13B, and the third region 13C of the intermediate cylindrical portion 13 are located. Each of the welding dowels 14 curves in an arc shape around the rotation center C of the ratchet 10. In the side frame 2F, a circular-shaped through hole 2Fb passes through the side frame 2F in the axial direction in a position where the through hole 2Fb faces the through hole 11A, which is formed in the central portion (position on the rotation center C) of the ratchet 10, in the axial direction. The operation pin 5A inserted into the through hole 11A of the ratchet 10 is inserted into the through hole 2Fb in the axial direction.

Guide 20

As shown in FIG. 5, the guide 20 is formed by cutting a metal plate-shaped member into a substantial disk shape having an outer diameter slightly larger than that of the ratchet 10 and by extruding portions of the metal plate-shaped member in a half-punched shape in the plate thickness direction (axial direction). Specifically, a cylindrical portion 22 protruding in the axial direction, which is the assembling direction of the guide 20 to the ratchet 10, is extruded in a half-punched shape on an outer circumferential edge portion of a disk main body 21 of the guide 20.

Figure 9:
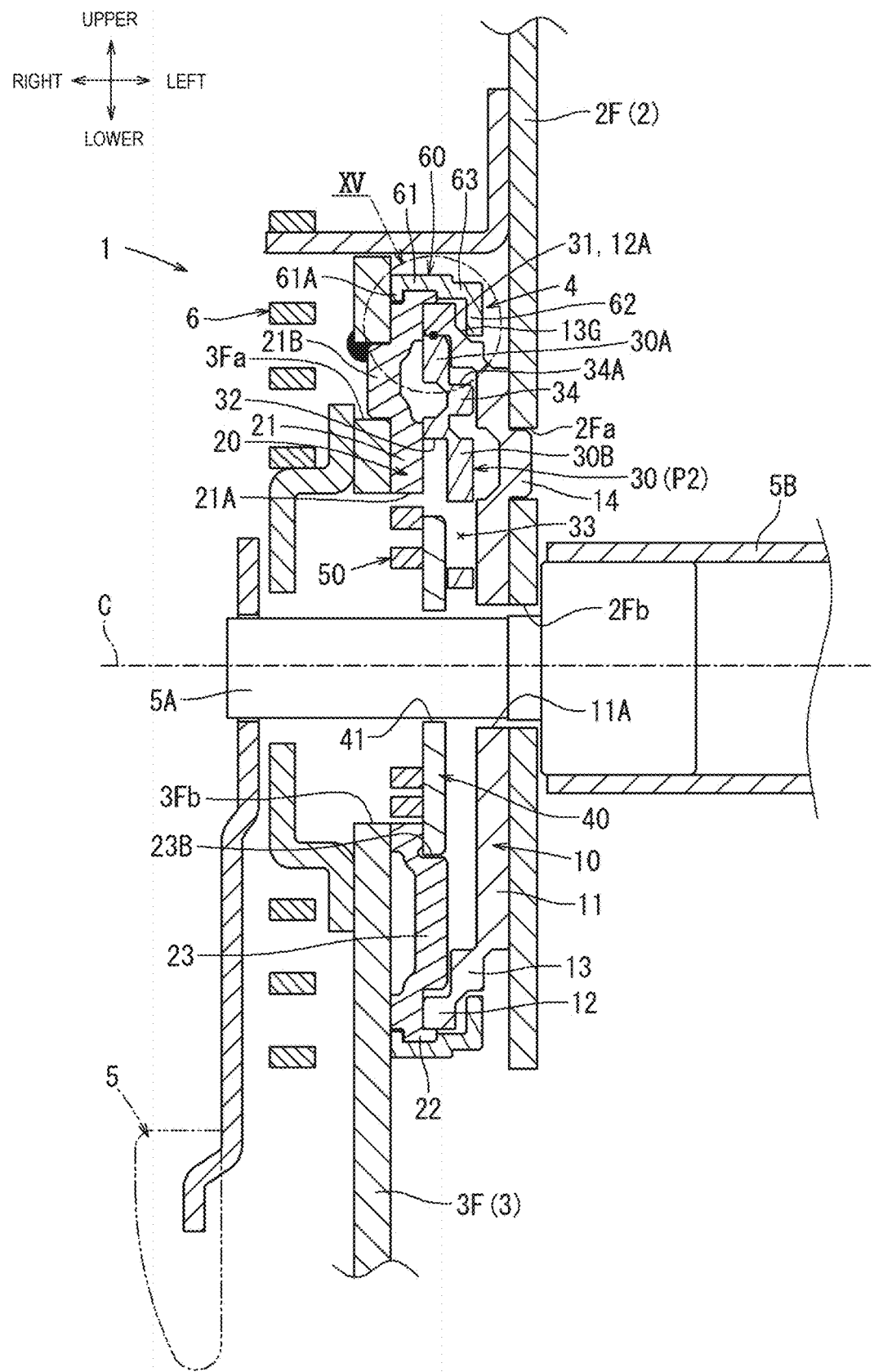
FIG. 9 is a sectional view taken along a line IX-IX of FIG. 1.

The cylindrical portion 22 has an inner diameter dimension slightly larger than an outer diameter dimension of the cylindrical portion 12 of the ratchet 10. Specifically, the cylindrical portion 22 has a thickness in the radial direction smaller than the plate thickness of an outer circumferential ring 60 to be described later (see FIG. 15). More specifically, the cylindrical portion 22 has such a small thickness in the radial direction that an outer circumferential surface thereof is located in the radial direction inward of an outer circumferential surface of a stepped portion 63 of the outer circumferential ring 60 to be described later. As shown in FIG. 9, the guide 20 is set in such a way that the cylindrical portion 12 of the ratchet 10 is loosely fitted into the cylindrical portion 22 in the axial direction.

As a result, in a state in which the cylindrical portions 22, 12 are loosely fitted to each other on an inner side and an outer side in the radial direction, the guide 20 and the ratchet 10 are assembled to be rotatable relative to each other in a state in which the guide 20 and the ratchet 10 are supported from the inner side and the outer side. The outer circumferential ring 60 to be described later is installed in a manner of crossing the cylindrical portion 22 of the guide 20 and the cylindrical portion 12 of the ratchet 10 from an outer circumferential side, and thereby the guide 20 is assembled to the ratchet 10 via the outer circumferential ring 60 in a state in which the guide 20 is prevented from coming off in the axial direction (see FIGS. 2, 3, and 6 to 9).

As shown in FIG. 5, on an inner surface of the disk main body 21 of the guide 20, guide walls 23 protruding in a substantial fan shape in the axial direction, which is the assembling direction to the ratchet 10, are extruded in a half-punched shape in three positions in the rotation direction. Outer circumferential surfaces of the guide walls 23 on outer sides in the radial direction curve in an arc shape on the same circumference around the rotation center C of the guide 20. The guide walls 23 are loosely fitted inside the cylindrical portion 12 of the ratchet 10 assembled into the cylindrical portion 22 of the guide 20.

The guide walls 23 define recessed pawl accommodating grooves 24A in regions between the guide walls 23 in the rotation direction on an inner surface of the disk main body 21 of the guide 20. The pawl accommodating grooves 24A allow the three pawls 30, which will be described later, to be slidable inward and outward in the radial direction only. A cam accommodating groove 24B is formed in a central region on the inner surface of the disk main body 21 surrounded by the guide walls 23. The cam accommodating groove 24B allows the rotary cam 40 to be axially rotatable.

Figure 11:
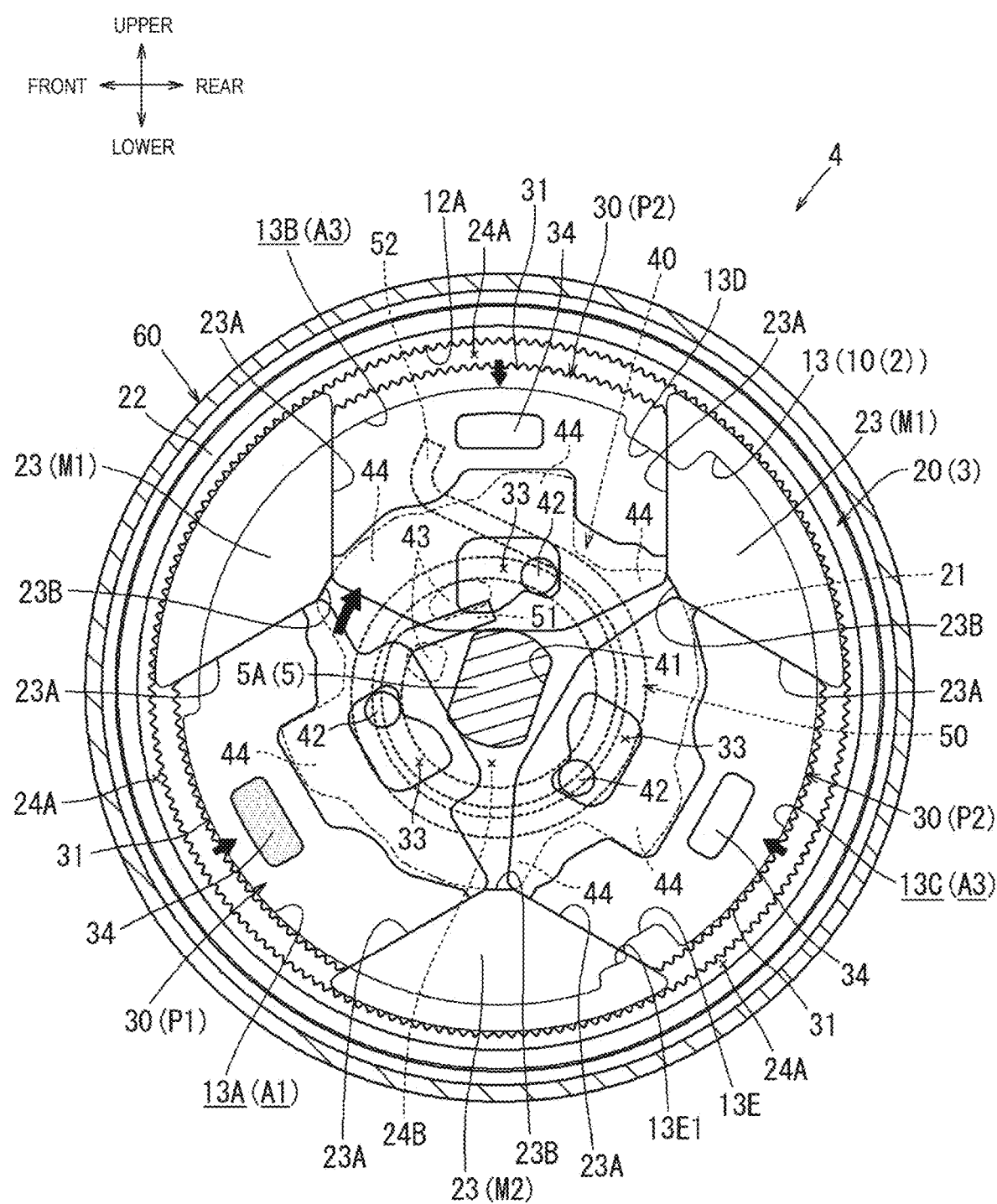
FIG. 11 is a sectional view corresponding to FIG. 10, showing an unlocked state of the vehicle seat reclining device.

As shown in FIGS. 10 and 11, the guide walls 23 have regulating surfaces 23A which are two side surfaces in the rotation direction that face the corresponding pawl accommodating grooves 24A. The guide walls 23 support the corresponding pawls 30 set in the pawl accommodating grooves 24A from both sides in the rotation direction with the corresponding regulating surfaces 23A. Accordingly, the guide walls 23 guide the corresponding pawls 30 from both sides in the rotation direction so that the pawls 30 slide inward and outward in the radial direction only.

The guide walls 23 have support surfaces 23B which are inner circumferential surfaces in the radial direction that face the cam accommodating groove 24B. The guide walls 23 support the rotary cam 40 set in the cam accommodating groove 24B from the outer side in the radial direction by the support surfaces 23B. As a result, the guide walls 23 guide the rotary cam 40 from the outer side in the radial direction so that the rotary cam 40 is rotatable in a substantially central (rotation center C) position on the disk main body 21 of the guide 20.

Further, as shown in FIGS. 4 and 5, a substantially circular-shaped through hole 21A passes in the axial direction through a central portion (position on the rotation center C) of the disk main body 21 of the guide 20. The lock spring 50 to be described later is disposed in the through hole 21A. The through hole 21A is formed with an elongated hooking hole 21Aa extending outward in the radial direction. An outer end portion 52 of the lock spring 50 disposed in the through hole 21A is fitted into the hooking hole 21Aa in the axial direction and is integrated with the hooking hole 21Aa in the rotation direction.

As shown in FIG. 2, the guide 20 is set in such a way that the outer surface of the disk main body 21 is in surface contact with the inner surface of the reclining plate 3F, and the guide 20 is integrally coupled to the reclining plate 3F by welding the contact portions of the guide 20 and the reclining plate 3F. Specifically, the guide 20 has three welding dowels 21B protruding from the outer surface of the disk main body 21, and the three welding dowels are fitted into three corresponding fitting holes 3Fa formed in the reclining plate 3F. The fitting portions are integrally coupled to the outer surface of the reclining plate 3F by arc welding.

As shown in FIG. 4, the welding dowels 21B are extruded in a floating island shape in the axial direction one by one in regions on a back side of the pawl accommodating grooves 24A (see FIG. 5) on the outer surface of the disk main body 21. As shown in FIG. 2, the reclining plate 3F is formed with a circular-shaped through hole 3Fb that passes through the reclining plate 3F in the axial direction in a position where the through hole 3Fb faces the through hole 21A, which is formed in the central portion (position on the rotation center C) of the guide 20, in the axial direction. The operation pin 5A inserted into the through hole 21A of the guide 20 is inserted into the through hole 3Fb in the axial direction.

Pawls 30

As shown in FIGS. 4 and 5, each of the three pawls 30 is formed by cutting a metal plate-shaped member into a substantially rectangular shape and by extruding portions of the metal plate-shaped member in a half-punched shape in the plate thickness direction (axial direction). Specifically, the pawl 30 has a shape in which an offset surface portion 30B constituting a substantially inner half region of the pawl 30 in the radial direction is extruded in a half-punched shape by a substantial plate thickness in the axial direction that is the assembling direction to the ratchet 10 relative to a main body surface portion 30A constituting a substantially outer half region in the radial direction.

The three pawls 30 have substantially the same shape, and one of the three pawls 30 serves as the main pawl P1 having a function different from those of the other two sub-pawls P2. Specific configurations thereof will be described in detail below. Hereinafter, specific configurations of components common to the pawls 30 will be described first.

As shown in FIGS. 10 and 11, the respective pawls 30 are accommodated one by one in the respective pawl accommodating grooves 24A formed on the inner surface of the disk main body 21 of the guide 20. With such setting, the pawls 30 are supported in a planar shape from both sides in the rotation direction by the regulating surfaces 23A of the guide walls 23 facing the pawl accommodating grooves 24A from both sides in the rotation direction. As a result, the pawls 30 are supported to be movable inward and outward in the radial direction only along the regulating surfaces 23A.

Specifically, as shown in FIG. 9, when the pawls 30 are set in the pawl accommodating grooves 24A (see FIG. 5), main body surface portions 30A abut against the inner surface of the disk main body 21 of the guide 20 in the axial direction. As a result, the inner teeth 12A of the cylindrical portion 12 of the ratchet 10 set in the cylindrical portion 22 of the guide 20 face the pawls 30 in the radial direction in positions on outer sides of the main body surface portions 30A in the radial direction. In addition, the offset surface portions 30B of the pawls 30 are separated in the axial direction from the inner surface of the disk main body 21 of the guide 20, and overlap with the intermediate cylindrical portion 13 of the ratchet 10 in the axial direction.

As shown in FIG. 4, outer circumferential surfaces of the main body surface portions 30A of the pawls 30 on an outer side in the radial direction are formed with the outer teeth 31 whose tooth surfaces face outward in the radial direction. The outer teeth 31 are continuously arranged over the entire region in the rotation direction. The outer circumferential surfaces of the pawls 30 on which the outer teeth 31 are formed have a convex curving surface shape along the inner circumferential surface shape of the cylindrical portion 12 on which the inner teeth 12A of the ratchet 10 are formed.

Similar to the inner teeth 12A of the ratchet 10 that mesh with the outer teeth 31, the outer teeth 31 of the pawls 30 have a shape in which tooth surfaces are arranged at equal intervals at a pitch of two degrees in the rotation direction. With the above configuration, as shown in FIG. 10, the outer teeth 31 of the pawls 30 are pressed into the inner teeth 12A of the ratchet 10 from the inner side in the radial direction, and thereby substantially all the outer teeth 31 mesh with the inner teeth 12A. However, more strictly, the outer teeth 31 of the pawls 30 mesh with the inner teeth 12A of the ratchet 10 in such a way that the tooth surface at the center of the outer teeth 31 in the rotation direction is most deeply inserted into the inner teeth 12A (mesh point K), and the tooth height decreases from the mesh point K toward both ends in the rotation direction so that the insertion of the outer teeth 31 into the inner teeth 12A gradually becomes shallower.

Thus, when the outer teeth 31 of the pawls 30 mesh with the inner teeth 12A of the ratchet 10, all the tooth surfaces of the outer teeth 31 do not grip the tooth surfaces of the inner teeth 12A even when the pawls 30 are pressed straight outward in the radial direction so that the outer teeth 31 can be appropriately meshed with the inner teeth 12A. That is, the tooth surface at the center of the outer teeth 31 of the pawls 30 faces straight the advancing direction of the meshing movement.

However, the other tooth surfaces arranged from the central tooth surface of the outer teeth 31 toward both end sides in the rotation direction are oblique in the rotation direction relative to the central tooth surface. For this reason, when the pawls 30 are pressed outward in the radial direction, the central tooth surface moves straight toward the corresponding tooth surface of the inner teeth 12A of the ratchet 10, while the other teeth enter the corresponding tooth surfaces of the inner teeth 12A at an oblique angle.

However, as described above, since the tooth surfaces of the outer teeth 31 have a shape in which the tooth height gradually decreases from the central tooth surface toward the tooth surfaces on both end sides in the rotation direction, the tooth surfaces of the outer teeth 31 can be brought into a state (meshing state) of entering the tooth surfaces of the inner teeth 12A without being abutted against the tooth surfaces of the inner teeth 12A even when the tooth surfaces other than the central tooth surface enter the tooth surfaces of the inner teeth 12A at an oblique angle. The tooth surface shape of the outer teeth 31 is the same as that disclosed in JP-A-2015-029635, for example, and thus detailed description thereof will be omitted.

As shown in FIG. 9, the rotary cam 40 to be described later, which is set at the central portion of the guide 20, faces the main body surface portions 30A in the radial direction in a region on an inner circumferential side of the main body surface portions 30A of the pawls 30. By such setting, the pawls 30 are provided in a state in which the main body surface portions 30A face the rotary cam 40 in the radial direction and the offset surface portions 30B face the rotary cam 40 in the axial direction.

As shown in FIG. 4, inner circumferential surface portions of the main body surface portions 30A of the pawls 30 are formed with pressed surface portions 32. The pressed surface portions 32 face the rotary cam 40 in the radial direction and are pressed outward from the inner side in the radial direction with the rotation of the rotary cam 40. As shown in FIG. 5, pull-in holes 33 pass in the axial direction through intermediate portions of the offset surface portions 30B of the pawls 30. The pull-in holes 33 are operated in such a way that pull-in pins 42 formed in corresponding three positions of the rotary cam 40 are inserted into the intermediate portions of the offset surface portions 30B and are pulled inward in the radial direction with the rotation of the rotary cam 40. The riding protrusions 34 protruding in the same axial direction as the pressing direction of the offset surface portions 30B are formed at intermediate portions of the main body surface portions 30A of the pawls 30.

As shown in FIG. 10, when the rotary cam 40 is rotated in the counterclockwise direction in the drawing by a spring biasing force of the lock spring 50 hooked between the rotary cam 40 and the guide 20, the pressed surface portions 32 of the pawls 30 are pressed outward from the inner side in the radial direction by corresponding pressing portions 44 formed on an outer circumferential surface portion of the rotary cam 40. Accordingly, the outer teeth 31 of the pawls 30 are pressed against and meshed with the inner teeth 12A of the ratchet 10, and the pawls 30 are held in this state (locked state). Accordingly, the pawls 30 are integrally coupled to the ratchet 10 in the rotation direction, and the relative rotation between the ratchet 10 and the guide 20 is locked by the pawls 30.

As shown in FIG. 11, when the rotary cam 40 is rotated in the clockwise direction in the drawing against the spring biasing force of the lock spring 50 by the operation of the reclining lever 5, the pull-in holes 33 of the pawls 30 are pulled inward in the radial direction by the corresponding pull-in pins 42 of the rotary cam 40. Accordingly, the outer teeth 31 of the pawls 30 are disengaged from the state of meshing with the inner teeth 12A of the ratchet 10, and the pawls 30 are held in this state (unlocked state). Accordingly, a rotation locked state between the ratchet 10 and the guide 20 is released.

Figure 15:
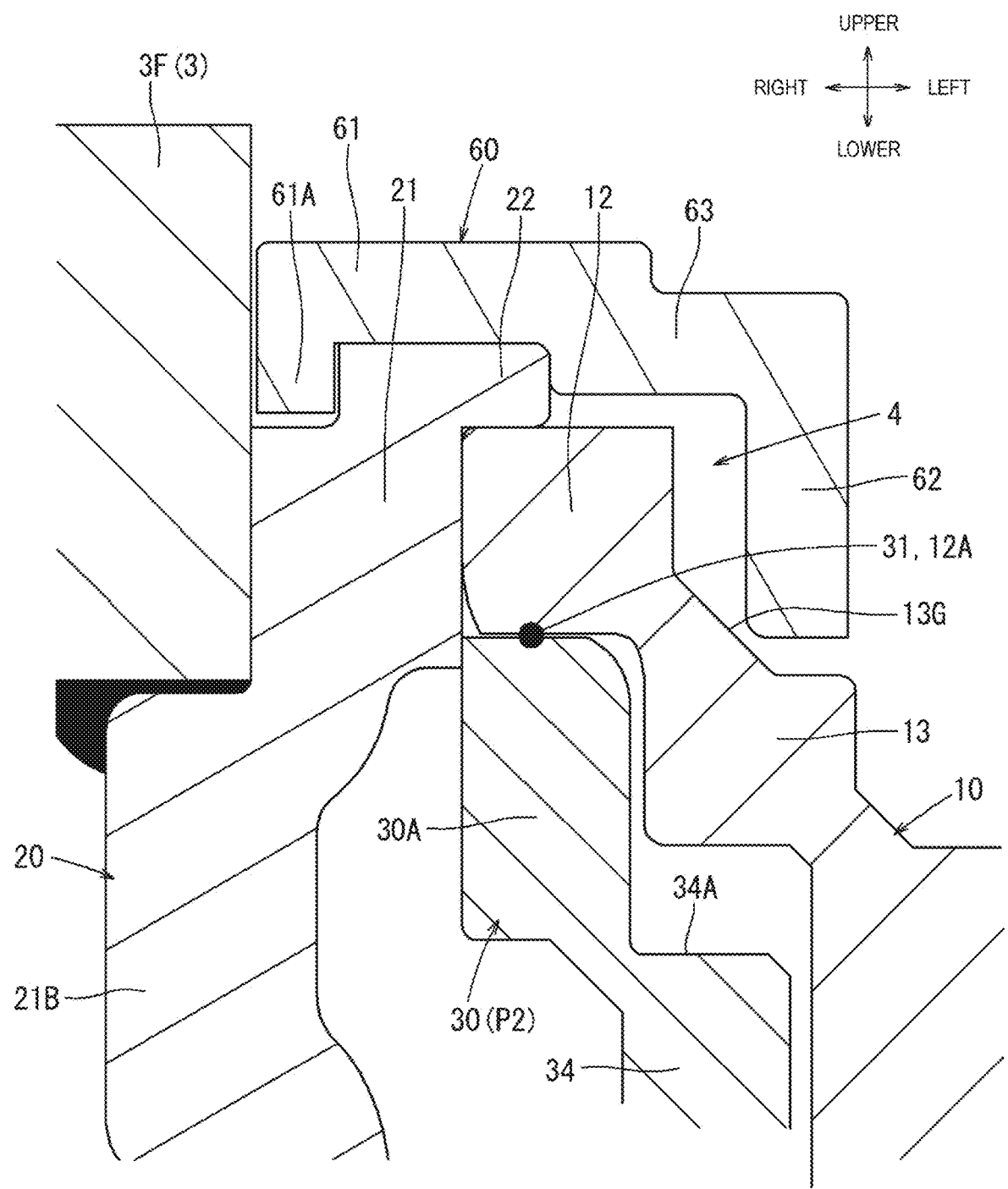
FIG. 15 is an enlarged view of a portion XV of FIG. 9.

As shown in FIG. 9, the riding protrusions 34 of the pawls 30 are extruded in a half-punched shape in the axial direction (right in the drawing) to substantially the same positions as the offset surface portions 30B of the pawls 30. As shown in FIG. 15, the riding protrusions 34 of the pawls 30 are set in a state in which outer circumferential surface portions 34A thereof face the inner circumferential surface of the intermediate cylindrical portion 13 of the ratchet 10 in the radial direction. As shown in FIG. 10, part (a) of FIG. 17, and part (a) of FIG. 18, when the rotation position of the ratchet 10 relative to the guide 20 defines the lock region A1, the riding protrusions 34 of the pawls 30 are not pressed against the inner circumferential surface of the intermediate cylindrical portion 13 of the ratchet 10 even when the pawls 30 are pressed outward in the radial direction by the rotary cam 40. Therefore, the movement of the pawls 30 of meshing with the inner teeth 12A of the ratchet 10 is not hindered.

However, as shown in FIG. 13, part (b) of FIG. 17, and part (b) of FIG. 18, when the rotation position of the ratchet 10 relative to the guide 20 is shifted to define the free region A2, the riding protrusions 34 of the pawls 30 are pressed against the inner circumferential surface of the intermediate cylindrical portion 13 of the ratchet 10 by the pawls 30 being pressed outward in the radial direction by the rotary cam 40. Accordingly, the movement of the pawls 30 of meshing with the inner teeth 12A of the ratchet 10 is blocked halfway. Hereinafter, the above configurations will be described in detail.

The riding protrusions 34 of the pawls 30 have different dimensions in the radial direction, that is, positions in the radial direction, from the central portion (position on the rotation center C) of the guide 20 to the outer circumferential surface portions 34A thereof between the main pawl P1 and the other two sub-pawls P2. Specifically, the riding protrusion 34 of the main pawl P1 is formed in a position where the riding protrusion 34 of the main pawl P1 protrudes outward in the radial direction relative to the riding protrusions 34 of the other two sub-pawls P2.

As shown in FIG. 10, part (a) of FIG. 17, and part (a) of FIG. 18, when the riding protrusion 34 of the main pawl P1 overlaps with the first region 13A (lock region A1) of the intermediate cylindrical portion 13 of the ratchet 10 in the rotation direction, the riding protrusion 34 is not pressed to a position where the riding protrusion 34 rides on the first region 13A even when the main pawl P1 is pressed outward in the radial direction to a position where the main pawl P1 meshes with the inner teeth 12A of the ratchet 10 by the rotary cam 40. Therefore, the movement of the main pawl P1 of meshing with the inner teeth 12A of the ratchet 10 is not hindered.

At this time, the riding protrusions 34 of the other two sub-pawls P2 are not pressed to positions where the riding protrusions 34 ride on the second region 13B and the third region 13C even when the riding protrusions 34 are pressed outward in the radial direction to positions where the two sub-pawls P2 mesh with the inner teeth 12A of the ratchet 10 by the rotary cam 40. Therefore, the movement of the sub-pawls P2 of meshing with the inner teeth 12A of the ratchet 10 is not hindered.

That is, the two sub-pawls P2 are formed in positions radially inward of the riding protrusion 34 of the main pawl P1. For this reason, even when the two sub-pawls P2 overlap with the second region 13B (relief region A3) and the third region 13C (relief region A3), which protrude inward in the radial direction relative to the first region 13A, in the rotation direction, the two sub-pawls P2 are not pressed to positions where the two sub-pawls P2 ride correspondingly on the second region 13B and the third region 13C when the two sub-pawls P2 are pressed outward in the radial direction by the rotary cam 40.

On the other hand, as shown in FIG. 13, part (b) of FIG. 17, and part (b) of 18, when the riding protrusion 34 of the main pawl P1 overlaps with the second region 13B (free region A2) of the intermediate cylindrical portion 13 of the ratchet 10 in the rotation direction, the riding protrusion 34 is pressed outward in the radial direction by the rotary cam 40 to ride on the second region 13B. Accordingly, the movement of the main pawl P1 of meshing with the inner teeth 12A of the ratchet 10 is blocked halfway.

At this time, even when the riding protrusions 34 of the other two sub-pawls P2 overlap with the corresponding third region 13C (relief region A3) and the first region 13A (relief region A3) in the rotation direction, the riding protrusions 34 are not pressed to positions where the riding protrusions 34 ride on the third region 13C (relief region A3) and the first region 13A (relief region A3) when the riding protrusions 34 are pressed outward in the radial direction by the rotary cam 40. Therefore, the outward movement of the sub-pawls P2 in the radial direction is not blocked.

However, even in such a configuration, since the rotation of the rotary cam 40 is blocked halfway by the movement of the main pawl P1 being blocked halfway, the sub-pawls P2 are not further pressed outward in the radial direction. Therefore, the sub-pawls P2 are held together with the main pawl P1 in the unlocked state in which the meshing movement of the ratchet 10 toward the inner teeth 12A is prevented halfway.

Rotary Cam 40

As shown in FIG. 5, the rotary cam 40 is formed by cutting a metal plate-shaped member into a substantial disk shape and extruding portions of the metal plate-shaped member in a half-punched shape in the plate thickness direction (axial direction). The rotary cam 40 is accommodated in the cam accommodating groove 24B formed on the inner surface of the disk main body 21 of the guide 20. As shown in FIG. 9, the rotary cam 40 has a plate thickness substantially equal to those of the pawls 30.

The rotary cam 40 is sandwiched in the axial direction between the inner surface of the disk main body 21 of the guide 20 and the offset surface portions 30B extruded in a half-punched shape in the axial direction of the pawls 30. Accordingly, the rotary cam 40 is covered from the outer side in the radial direction by the pressed surface portions 32 that are inner circumferential surface portions of the main body surface portions 30A of the pawls 30.

As shown in FIG. 5, a through hole 41 is formed in a central portion (position on the rotation center C) of the rotary cam 40. The operation pin 5A is inserted into the through hole 41 from an inner side in the axial direction and is integrally coupled with the rotary cam 40. The operation pin 5A passes through the through hole 41 of the rotary cam 40 from the inner side to the outer side in the axial direction, and is integrally connected to the reclining lever 5 in FIG. 1 at its destination. With the above assembly, the operation pin 5A integrally rotates the rotary cam 40 in accordance with the operation of pulling up the reclining lever 5.

The operation pin 5A is integrally coupled to the operation pin 5A inserted into the seat reclining device 4 on the other side in FIG. 1 via a connecting rod 5B. Accordingly, the two operation pins 5A are rotated at the same time by the operation of pulling up the reclining lever 5, and rotary cams 40 of the two seat reclining devices 4 are rotated at the same time.

Figure 6:
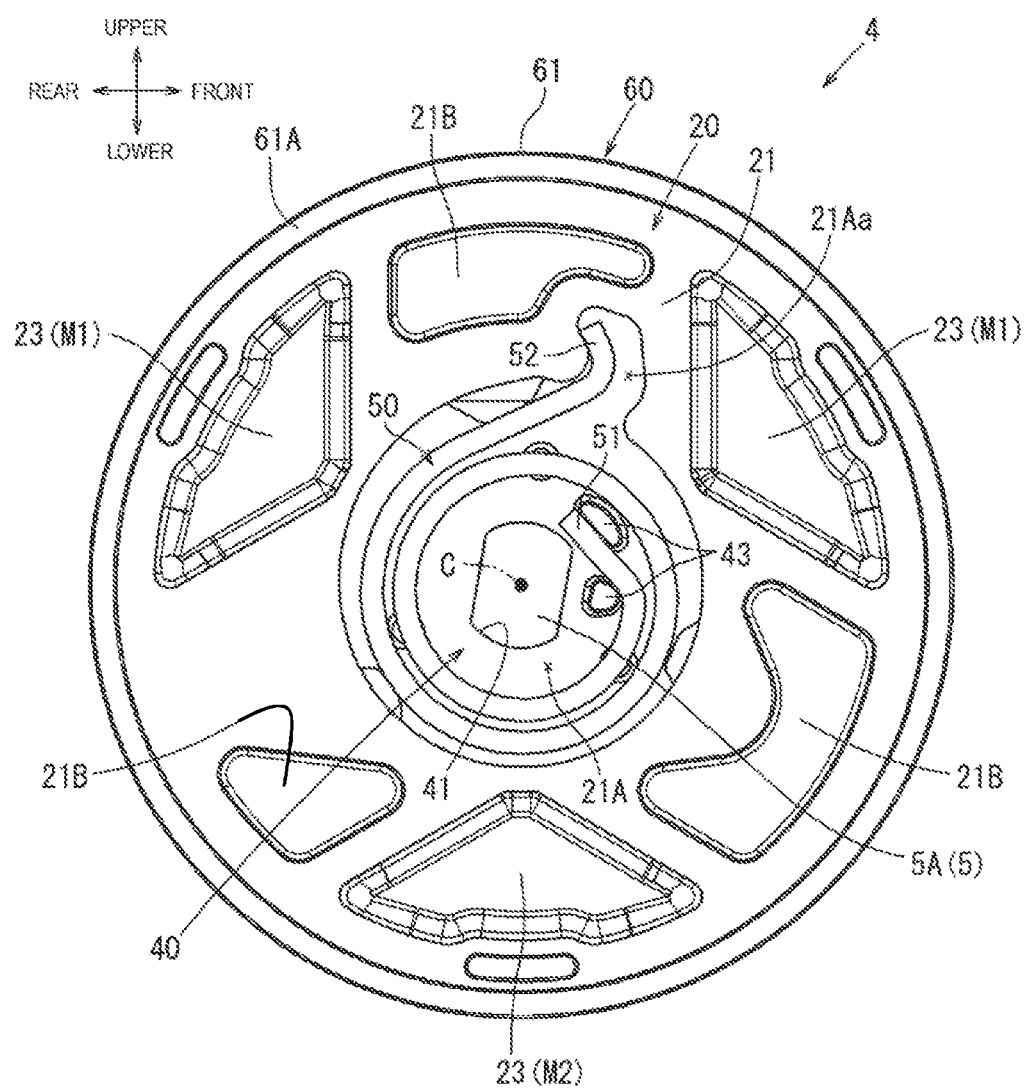
FIG. 6 is an outer view of the vehicle seat reclining device.
Figure 7:
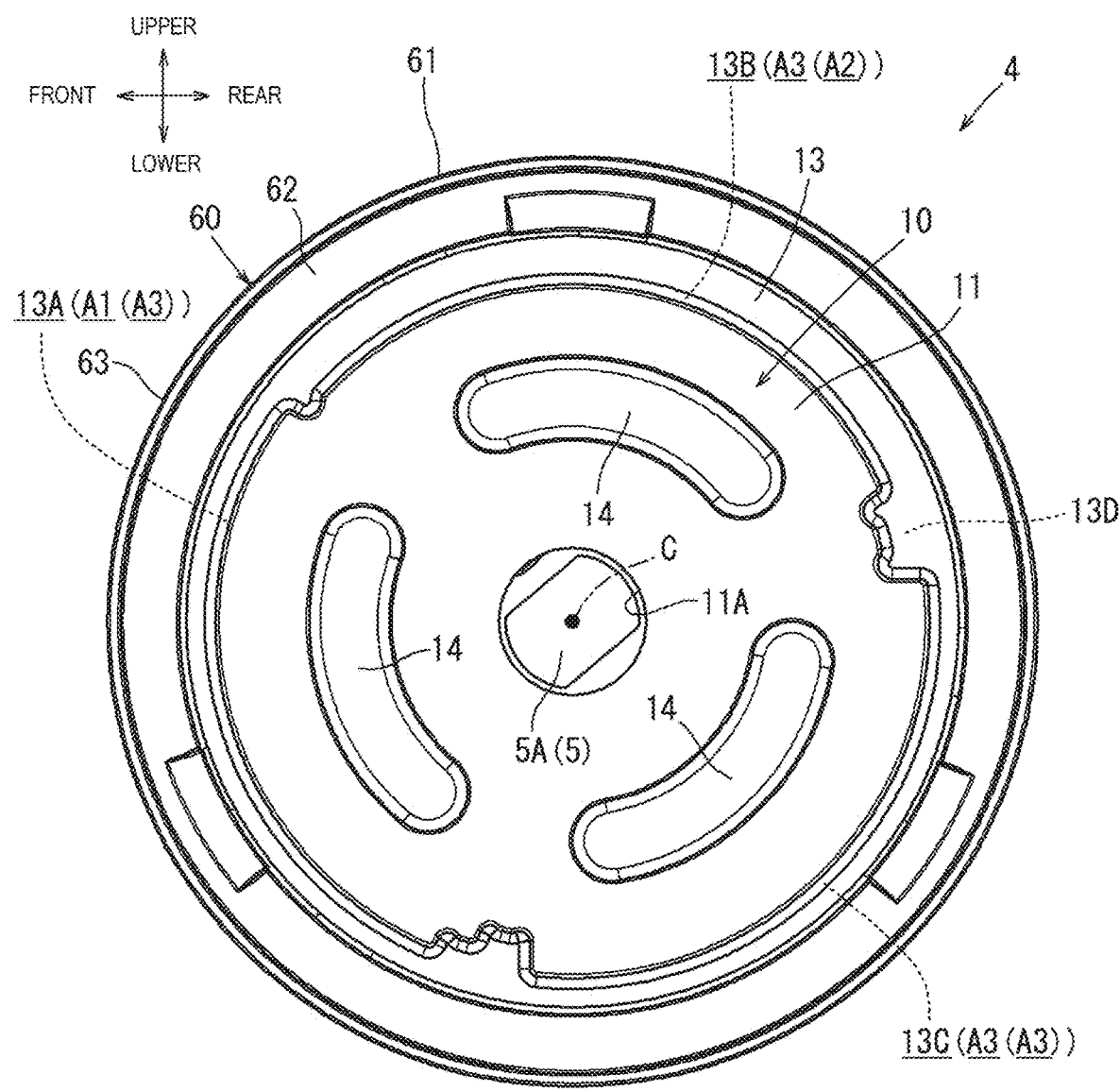
FIG. 7 is an inner view of the vehicle seat reclining device.
Figure 8:
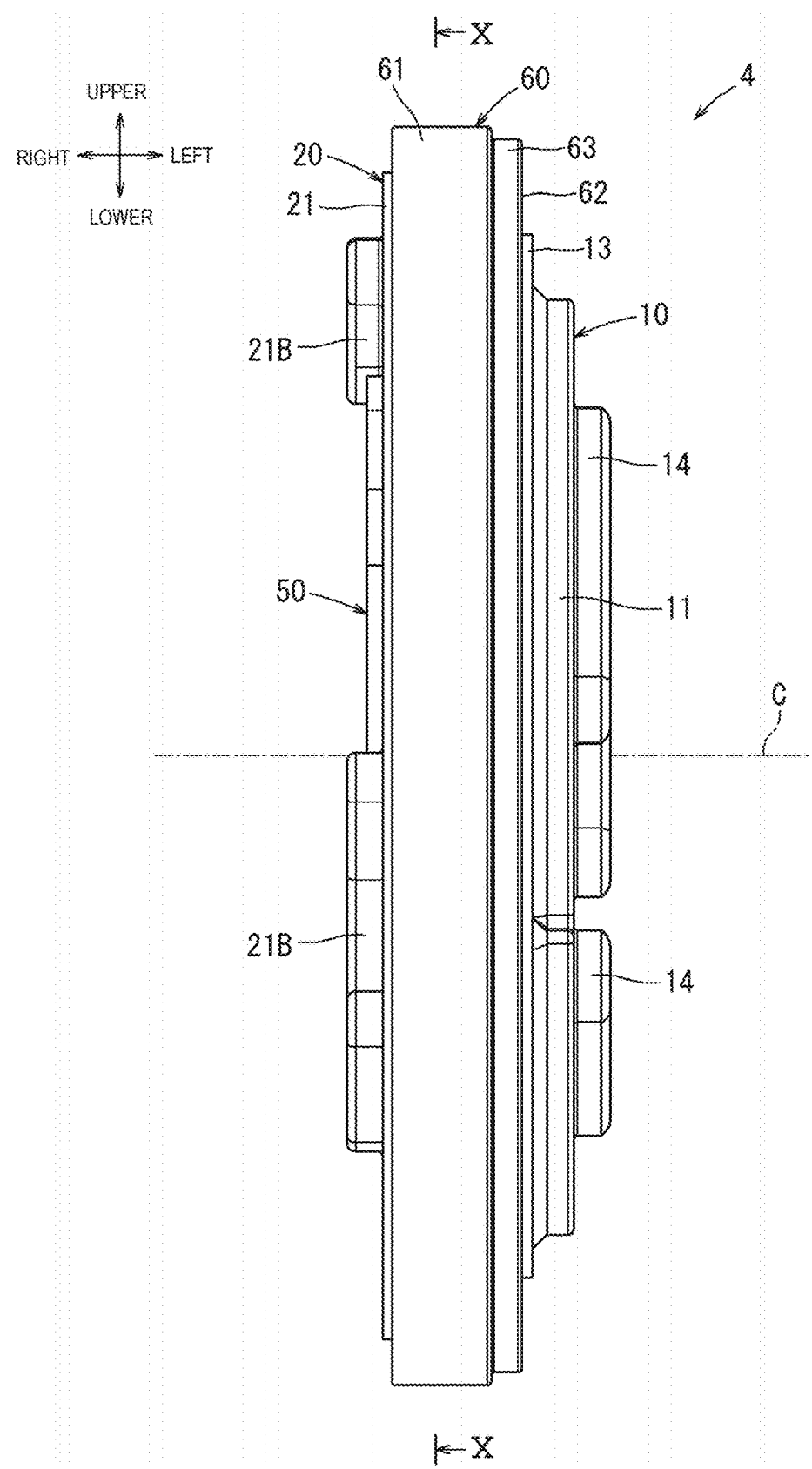
FIG. 8 is a front view of the vehicle seat reclining device.

As shown in FIG. 5, the rotary cam 40 is formed in a substantial disk shape that is slightly larger than the through hole 21A formed in the central portion (position on the rotation center C) of the guide 20. The rotary cam 40 includes two hook pins 43 on an outer surface of the rotary cam 40 that faces the through hole 21A of the guide 20. The two hook pins 43 protrude in the axial direction toward the through hole 21A. As shown in FIGS. 2 and 6, an inner end portion 51 of the lock spring 50 is hooked and fixed to the hook pins 43. As shown in FIG. 10, the rotary cam 40 includes pull-in pins 42 on an inner surface of the rotary cam 40 that faces the offset surface portions 30B of the pawls 30. The pull-in pins 42 protrude in the axial direction and are disposed inside the pull-in holes 33 of the pawls 30.

The rotary cam 40 is assembled to the guide 20 in a state of being elastically supported by the guide 20 via the lock spring 50. Specifically, the assembly is performed in the following procedure. First, the rotary cam 40 is set in the cam accommodating grooves 24B of the guide 20. Next, the lock spring 50 is set in the through hole 21A of the guide 20, the inner end portion 51 of the lock spring 50 is hooked between the hook pins 43 of the rotary cam 40, and the outer end portion 52 of the lock spring 50 is hooked in the hooking hole 21Aa extending from the through hole 21A of the guide 20. As described above, the rotary cam 40 is assembled to the guide 20 in a state of being elastically supported by the guide 20 via the lock spring 50.

The rotary cam 40 is normally rotationally biased in the counterclockwise direction shown in FIG. 10 relative to the guide 20 by the spring biasing force of the lock spring 50. By the rotation due to the biasing, the rotary cam 40 normally presses the pressed surface portions 32 (see FIG. 9) of the pawls 30 from the inner side in the radial direction by the pressing portions 44 bulging from a plurality of locations on the outer circumferential surface portion of the rotary cam 40, and the pawls 30 mesh with the inner teeth 12A of the ratchet 10.

As shown in FIG. 11, when the reclining lever 5 in FIG. 1 is pulled up, the rotary cam 40 is rotated in the clockwise direction in the drawing via the operation pin 5A. Accordingly, the rotary cam 40 pulls the pawls 30 inward in the radial direction by the pull-in pins 42 inserted into the pull-in holes 33 of the pawls 30, thereby disengaging the pawls 30 from the state of meshing with the inner teeth 12A of the ratchet 10. Specifically, by the rotation of the rotary cam 40 in the clockwise direction in the drawing, the pull-in pins 42 are pressed against erected inclined surfaces on corresponding inner circumferential edge sides of the pull-in holes 33, and the pawls 30 are pulled inward in the radial direction.

In the rotary cam 40 as shown in FIG. 10, in the state (locked state) in which the pawls 30 are pressed from the inner side in the radial direction and meshed with the inner teeth 12A of the ratchet 10, the inner end portion 51 of the lock spring 50 hooked on the hook pins 43 is located in a region in the rotation direction between two guide walls M1 on an upper left side and an upper right side in the drawing among the three guide walls 23 formed on the guide 20.

In this state, the rotary cam 40 receives, due to the spring biasing force received from the inner end portion 51 of the lock spring 50, not only a rotational biasing force in the counterclockwise direction in the drawing relative to the guide 20 but also a biasing force in an eccentric direction to be pressed outward in the radial direction. However, since the three pawls 30 mesh with the inner teeth 12A of the ratchet 10, the rotary cam 40 is supported by the pawls 30 and is held in a centered state at the central portion (position on the rotation center C) of the guide 20.

Figure 16:
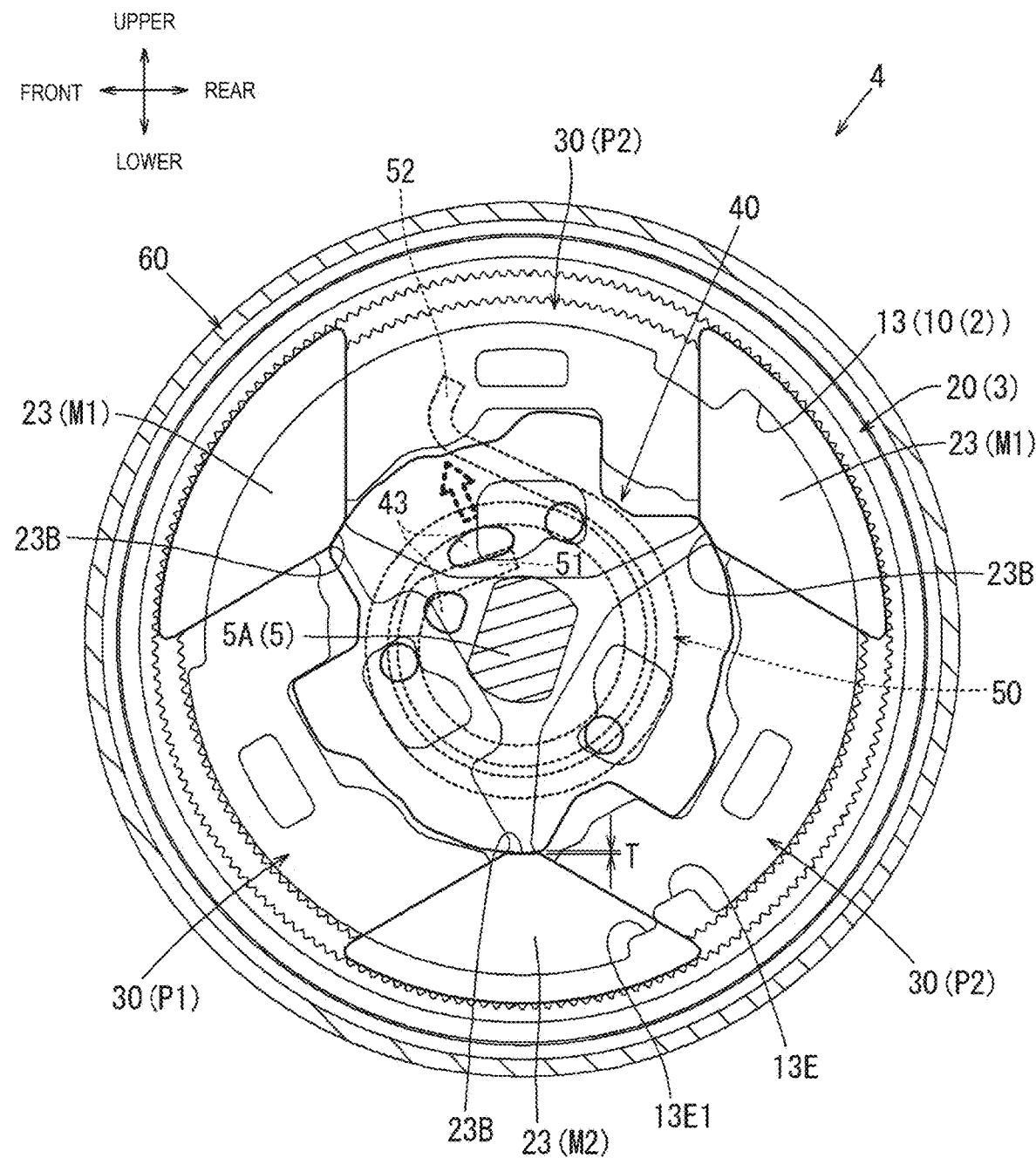
FIG. 16 is a sectional view showing a state in which a rotary cam is pressed against a guide wall by biasing.

As shown in FIG. 11, the rotary cam 40 is rotated in the clockwise direction in the drawing and the pawls 30 are disengaged from the state of meshing with the inner teeth 12A of the ratchet 10. Accordingly, the rotary cam 40 is rotated in the clockwise direction in the drawing by the biasing force in the eccentric direction received from the inner end portion 51 of the lock spring 50, resulting in being pressed against the support surfaces 23B on inner circumferential sides of the two guide walls M1 (the guide walls M1 on the upper left side and the upper right side in the drawing) as shown in FIG. 16 and slide on the support surfaces 23B of the two guide walls M1. At this time, unlike the two guide walls M1, the remaining guide wall M2 (guide wall M2 on a lower side in the drawing) does not come into contact with an outer circumferential surface of the rotary cam 40, and defines a slight gap T in the radial direction between the guide wall M2 and the outer circumferential surface of the rotary cam 40.

With such a configuration, the rotary cam 40 can be appropriately supported by the two guide walls M1 against which the rotary cam 40 is pressed by the spring biasing force of the lock spring 50 so as not to move in the axial deviation direction (eccentric direction). In addition, it is possible to appropriately prevent a movement in which the rotary cam 40 is axially deviated (decentered) in a certain direction of the other guide wall M2 with the two guide walls M1 as a fulcrum. Therefore, it is possible to smoothly slide and rotate the rotary, cam 40 in the releasing direction without decentering the rotary cam 40.

Outer Circumferential Ring 60

As shown in FIGS. 4 and 5, the outer circumferential ring 60 is formed in a substantially cylindrical shape having a hollow disk-shaped base (flange portion 62) by punching a thin metal plate into a ring plate shape and drawing an outer circumferential edge portion of the punched metal plate into a shape protruding in a cylindrical shape in the axial direction. Specifically, the outer circumferential ring 60 includes the flange portion 62 having a hollow disk shape and a straight surface facing the axial direction, and a coupling portion 61 protruding from an outer circumferential edge portion of the flange portion 62 in a substantially cylindrical shape in the axial direction.

Specifically, the outer circumferential edge portion of the outer circumferential ring 60 has a shape of being extruded in a stepped cylindrical shape in two stages in the axial direction. Accordingly, a cylindrical portion on an outer circumferential side of the stepped cylinder is formed as the substantially cylindrical coupling portion 61, and a cylindrical portion on an inner circumferential side is formed as a stepped portion 63 having a shorter protruding length in the axial direction than the coupling portion 61.

The outer circumferential ring 60 extends between outer circumferential portions of the ratchet 10 and the guide 20 as described below, and is assembled in such a way that the ratchet 10 and the guide 20 are prevented from coming off in the axial direction. First, the three pawls 30, the rotary cam 40, and the lock spring 50 are set on the guide 20. Next, the ratchet 10 is assembled to the guide 20 and is set inside the cylinder of the outer circumferential ring 60 (inside the coupling portion 61) together with the guide 20.

Then, as shown in FIG. 15, a protruding top portion of the coupling portion 61 is crimped onto an outer surface of the cylindrical portion 22 of the guide 20 (crimped portion 61A). As described above, the coupling portion 61 of the outer circumferential ring 60 is integrally coupled to the cylindrical portion 22 of the guide 20, and the flange portion 62 is abutted against the ratchet 10 from the outer side in the axial direction. Accordingly, the outer circumferential ring 60 extends between the outer circumferential portions of the ratchet 10 and the guide 20, and is assembled in such a way that the ratchet 10 and the guide 20 are prevented from coming off in the axial direction.

More specifically, the outer circumferential ring 60 is set in a state in which the cylindrical portion 22 of the guide 20 abuts against the stepped portion 63 in the axial direction by sequentially assembling the guide 20 into the cylindrical portion (the coupling portion 61) of the outer circumferential ring 60 from the ratchet 10. Then, the cylindrical portion 12 of the ratchet 10 is abutted against the flange portion 62 from the inner side in the axial direction. By the above setting, the cylindrical portion 22 of the guide 20 is fitted completely in the axial direction into the cylindrical coupling portion 61 of the outer circumferential ring 60.

After the above setting, the coupling portion 61 of the outer circumferential ring 60, specifically, the top end portion (crimped portion 61A) extending outward in the axial direction from the cylindrical portion 22 of the guide 20, bends inward in the radial direction, and is crimped on an outer surface of the cylindrical portion 22 of the guide 20 so that the cylindrical portion 22 is sandwiched in the axial direction between the crimped portion 61A and the stepped portion 63. Accordingly, the outer circumferential ring 60 is integrally coupled to the guide 20, and the ratchet 10 is abutted against the flange portion 62 from the outer side in the axial direction and is thus not detached in the axial direction.

The flange portion 62 of the outer circumferential ring 60 is set in such a manner that a top end portion protruding inward in the radial direction is attached to an inclined surface 13G formed on an outer surface portion in the axial direction of a portion coupling the intermediate cylindrical portion 13 and the cylindrical portion 12 of the ratchet 10. The inclined surface 13G faces obliquely outward in the radial direction. Therefore, with the top end portion of the flange portion 62 of the outer circumferential ring 60 being attached to the inclined surface 13G, the ratchet 10 is prevented from rattling outward in the axial direction or outward in the radial direction.

Width Setting Between Guide Walls 23 of Guide 20

Figure 21:
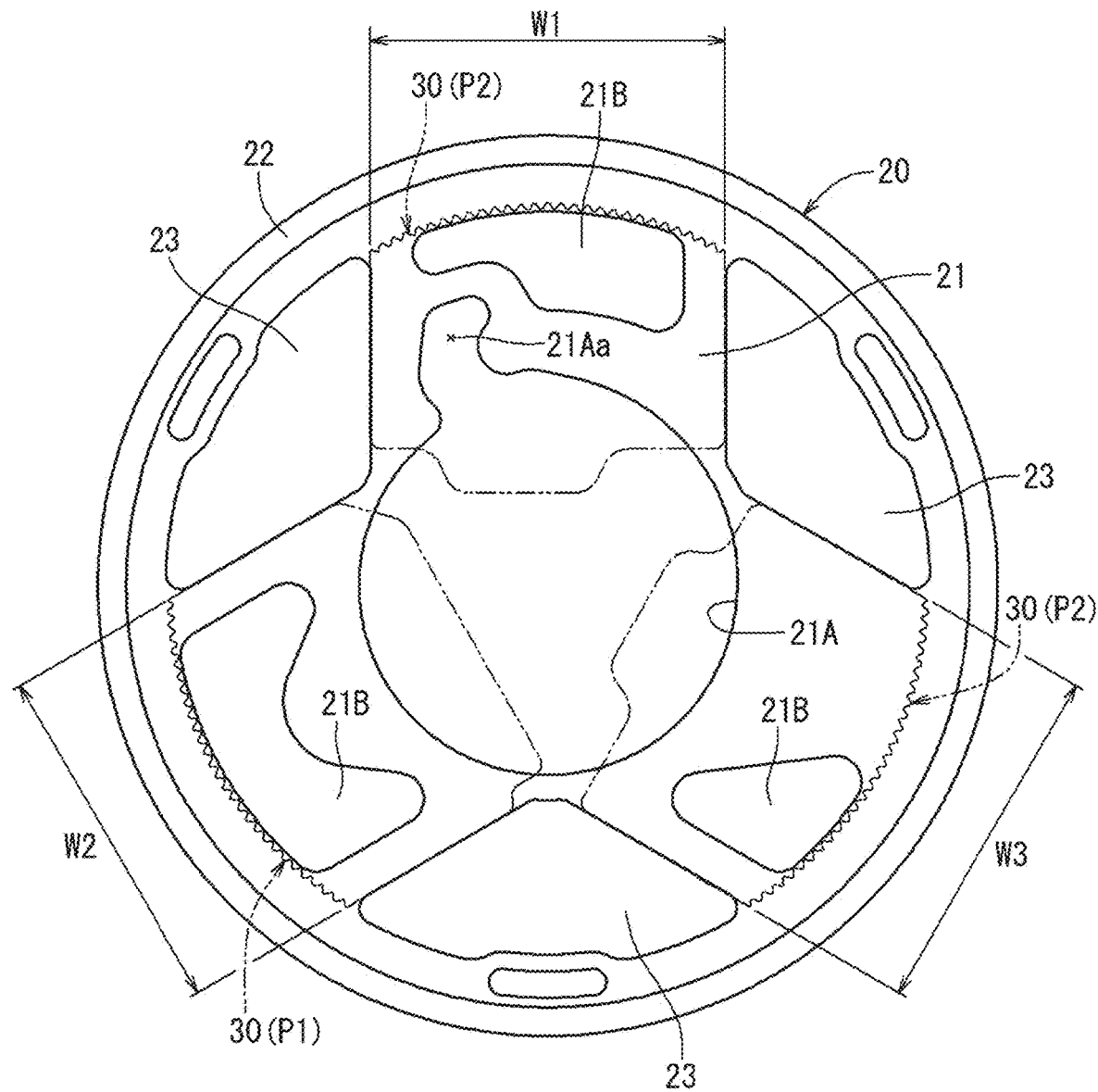
FIG. 21 is an inner view of a guide alone.

As shown in FIG. 21, widths W1 to W3 between the guide walls 23 of the guide 20 are set to be substantially equal to each other after the welding dowels 21B are welded, but different from each other before the welding dowels 21B are welded. Specifically, the widths W1 to W3 before welding between the guide walls 23 are set to satisfy a relation of W1>W2>W3. A reason for this is that the degree of contraction in the widths W1 to W3 before welding between the guide walls 23 due to thermal strain of welding differs from each other depending on shapes and welding lengths of the welding dowels 21B formed between the guide walls 23 and the presence or absence of the hooking hole 21Aa.

Specifically, the welding dowel 21B between the guide walls 23 that is configured to accommodate the main pawl P1 on a lower left side in FIG. 21 and the welding dowel 21B between the guide walls 23 that is configured to accommodate the sub-pawl P2 on an upper side in the drawing have the same circumferential length extending in an arc shape in respective rotation directions. Further, outer circumferential edge portions of the two welding dowels 21B to be welded to the reclining plate 3F also have the same welding length in the rotation direction. Here, the reclining plate 3F corresponds to a "seat frame" of the present disclosure.

The welding dowel 21B between the guide walls 23 that is configured to accommodate the sub-pawl P2 on a lower right side in the drawing has a circumferential length in the rotation direction shorter than those of the other two welding dowels 21B. Accordingly, the welding length in the rotation direction of an outer circumferential edge portion of the welding dowel 21B to be welded to the reclining plate 3F is also shorter than the welding lengths of the other two welding dowels 21B. However, a side edge portion of the welding dowel 21B that faces the guide wall 23 on the lower side in the drawing is also welded to the reclining plate 3F. Accordingly, the entire welding length of the welding dowel 21B is the same as the welding lengths of the other two welding dowels 21B.

The hooking hole 21Aa is formed on the pawl accommodating groove 24A defined between the guide walls 23 on an upper side in the drawing, and passes in the axial direction through the pawl accommodating groove 24A. Since the hooking hole 21Aa is formed, the rigidity of the pawl accommodating groove 24A defined between the guide walls 23 on the upper side in the drawing is lower than the rigidity of the pawl accommodating groove 24A between the other two sets of guide walls 23. For this reason, the pawl accommodating groove 24A on the upper side in the drawing is more likely to cause thermal strain (contraction deformation) in the rotation direction due to welding than the other two pawl accommodating grooves 24A. Therefore, by setting the width W1 between the guide walls 23 facing the region where the hooking hole 21Aa is formed to be larger than the widths W2 and W3 of the other regions, it is possible to reduce variation in the widths between the guide walls 23 after welding.

SUMMARY

In summary, the seat reclining device 4 according to the present embodiment has the following configuration. In the following description, reference numerals in parentheses correspond to respective configurations shown in the above embodiment.

That is, a vehicle seat reclining device (4) includes a ratchet (10), a guide (20), a plurality of pawls (30), a lock spring (50), and a cam (40). The ratchet (10) and the guide (20) are assembled in an axial direction to be rotatable relative to each other. The guide (20) includes a plurality of pairs of guide walls (23). The plurality of pawls (30) are respectively supported by the plurality of corresponding pairs of guide walls (23) from both sides in a rotation direction, and are configured to mesh with the ratchet (10) by being pressed outward in a radial direction to lock a relative rotation between the ratchet (10) and the guide (20). The lock spring (50) is attached to the guide (20). The cam (40) presses the plurality of pawls (30) from an inner side to an outer side in the radial direction by a biasing force of the lock spring (50).

The guide (20) has welding dowels (21B) and a hooking hole (21Aa). The welding dowels (21B) are each formed between the plurality of pairs of guide walls (23), protrudes outward in the axial direction, and are configured to be welded to a seat frame (3F). The hooking hole (21Aa) is formed between a specific pair of guide walls (23) included in the plurality of pairs of guide walls (23), and an end portion of the lock spring (50) is hooked in the hooking hole (21Aa). In a state before the welding dowels (21B) are welded to the seat frame (3F), a width (W1) between the specific pair of guide walls (23) in which the hooking hole (21Aa) is formed is set to be larger than widths (W2, W3) between another pair of guide walls (23) included in the plurality of pairs of guide walls (23).

According to the above configuration, the width (W1) between the specific pair of guide walls (23) in which the hooking hole (21Aa) is formed is likely to contract due to thermal strain caused by welding of the welding dowel (21B) due to a decrease in rigidity caused by the hooking hole (21Aa). However, in the state before the welding dowels (21B) are welded to the seat frame (3F), by setting the width (W1) between the specific pair of guide walls (23) to be larger than the other widths (W2, W3), a width after welding can be easily matched with the other widths. As a result, it is possible to reduce variation in the widths between the guide walls (23).

Other Embodiments

Although the embodiments of the present disclosure have been described using one embodiment, the present disclosure can be implemented in various forms other than the above embodiment.

1. The vehicle seat reclining device of the present disclosure can be applied to a seat other than a right seat of an automobile, and can also be widely applied to a seat provided for a vehicle other than an automobile, such as a railway, and other vehicles such as an aircraft and a ship. The vehicle seat reclining device may couple a seatback to a seat cushion in a state in which the backrest angle is adjustable, or couple the seatback to a base such as a bracket fixed to a vehicle body in a state in which the backrest angle is adjustable.

2. The vehicle seat reclining device may be configured in such a way that the ratchet is coupled to a base fixed to a vehicle body, such as a seat cushion, and the guide is coupled to a seatback.

3. Two or four or more pawls for locking the relative rotation between the ratchet and the guide may be provided side by side in the rotation direction. Arrangements of the pawls in the rotation direction are not limited to even arrangements, and the pawls may be arranged in a biased manner.

4. The cam that presses the pawls from the inner side to the outer side in the radial direction may be of a rotation type, or a sliding type (type that presses the pawls from the inner side to the outer side in the radial direction by sliding in the radial direction) as disclosed in JP-A-2014-217662, for example. Further, the operation of pulling back the pawls inward in the radial direction may be performed using a member separate from the cam such as a release plate as disclosed in JP-A-2015-227071, for example.

What is claimed is:

1. A vehicle seat reclining device comprising:
a ratchet and a guide assembled in an axial direction to be rotatable relative to each other, the guide including a plurality of pairs of guide walls;
a plurality of pawls respectively supported by the plurality of corresponding pairs of guide walls from both sides in a rotation direction, the plurality of pawls being configured to mesh with the ratchet by being pressed outward in a radial direction to lock a relative rotation between the ratchet and the guide;

a lock spring; and a cam configured to press the plurality of pawls from an inner side to an outer side in the radial direction by a biasing force of the lock spring, wherein the guide has:

welding dowels protruding outward in the axial direction and being configured to be welded to a seat frame, the respective welding dowels being formed between the respective pairs of guide walls, and a hooking hole formed between a specific pair of guide walls included in the plurality of pairs of guide walls, an end portion of the lock spring being hooked in the hooking hole, and wherein, in a state before the welding dowels are welded to the seat frame, a width between the specific pair of guide walls where the hooking hole is formed is larger than a width between another pair of guide walls included in the plurality of pairs of guide walls.

2. The vehicle seat reclining device according to claim 1, wherein welding lengths of the welding dowels to be welded are each substantially the same.

\* \* \* \* \*